(12) United States Patent
Trufasiu et al.

(10) Patent No.: US 12,113,847 B2
(45) Date of Patent: *Oct. 8, 2024

(54) SYSTEM AND METHOD FOR DATA TRANSFER, INCLUDING PROTOCOLS FOR USE IN DATA TRANSFER IN A CONTENT MANAGEMENT ENVIRONMENT

(71) Applicant: Open Text Corporation, Waterloo (CA)

(72) Inventors: Dan-Horia Trufasiu, Ontario (CA); George Frederick Kevin Morris, Whitby (CA); Tao Zhou, Richmond Hill (CA)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,144

(22) Filed: Oct. 14, 2022

(65) Prior Publication Data

US 2023/0038510 A1    Feb. 9, 2023

Related U.S. Application Data

(63) Continuation of application No. 17/349,473, filed on Jun. 16, 2021, now Pat. No. 11,516,281, which is a continuation of application No. 16/547,693, filed on Aug. 22, 2019, now Pat. No. 11,070,610.

(51) Int. Cl.
| | | |
|---|---|---|
| G06F 15/16 | (2006.01) | |
| G06F 16/16 | (2019.01) | |
| H04L 65/402 | (2022.01) | |
| H04L 67/06 | (2022.01) | |
| H04L 67/52 | (2022.01) | |
| H04L 67/60 | (2022.01) | |
| H04L 67/02 | (2022.01) | |

(52) U.S. Cl.
CPC ............ *H04L 67/06* (2013.01); *G06F 16/168* (2019.01); *H04L 65/4025* (2022.05); *H04L 67/52* (2022.05); *H04L 67/60* (2022.05); *H04L 67/02* (2013.01)

(58) Field of Classification Search
None
See application file for complete search history.

(56) References Cited

U.S. PATENT DOCUMENTS

| | | | | |
|---|---|---|---|---|
| 10,198,589 | B2 * | 2/2019 | Kumar | G06F 11/1464 |
| 10,216,754 | B1 * | 2/2019 | Douglis | G06F 16/1744 |
| 10,725,930 | B2 * | 7/2020 | Palmer | G06F 16/2246 |
| 2010/0250709 | A1 * | 9/2010 | Mallett | H04L 67/1082 |
| | | | | 709/224 |
| 2012/0054734 | A1 * | 3/2012 | Andrews | G06F 8/65 |
| | | | | 717/171 |
| 2015/0095385 | A1 * | 4/2015 | Mensch | G06F 16/40 |
| | | | | 707/827 |
| 2015/0163301 | A1 * | 6/2015 | Narayanan | H04L 67/1095 |
| | | | | 709/205 |

(Continued)

*Primary Examiner* — Yves Dalencourt
(74) *Attorney, Agent, or Firm* — Sprinkle IP Law Group

(57) ABSTRACT

Embodiments of a service based data transfer system are disclosed herein. Embodiments may of such a data transfer system may include a data transfer server providing a common data transfer interface such as a services interface that may be called by a client device to transfer data files to, or retrieve data files from a content management system.

19 Claims, 23 Drawing Sheets

(56) References Cited

U.S. PATENT DOCUMENTS

| | | | | |
|---|---|---|---|---|
| 2017/0024161 A1* | 1/2017 | Katiyar | ................ | G06F 3/0689 |
| 2017/0318119 A1* | 11/2017 | Zbiljic | ................ | G06F 12/0246 |
| 2017/0346887 A1* | 11/2017 | Kaguma | ............ | H04L 67/1093 |
| 2020/0042444 A1* | 2/2020 | Kang | ................ | H04L 67/1097 |
| 2021/0026980 A1* | 1/2021 | Candelario | ............ | G06F 21/64 |

* cited by examiner

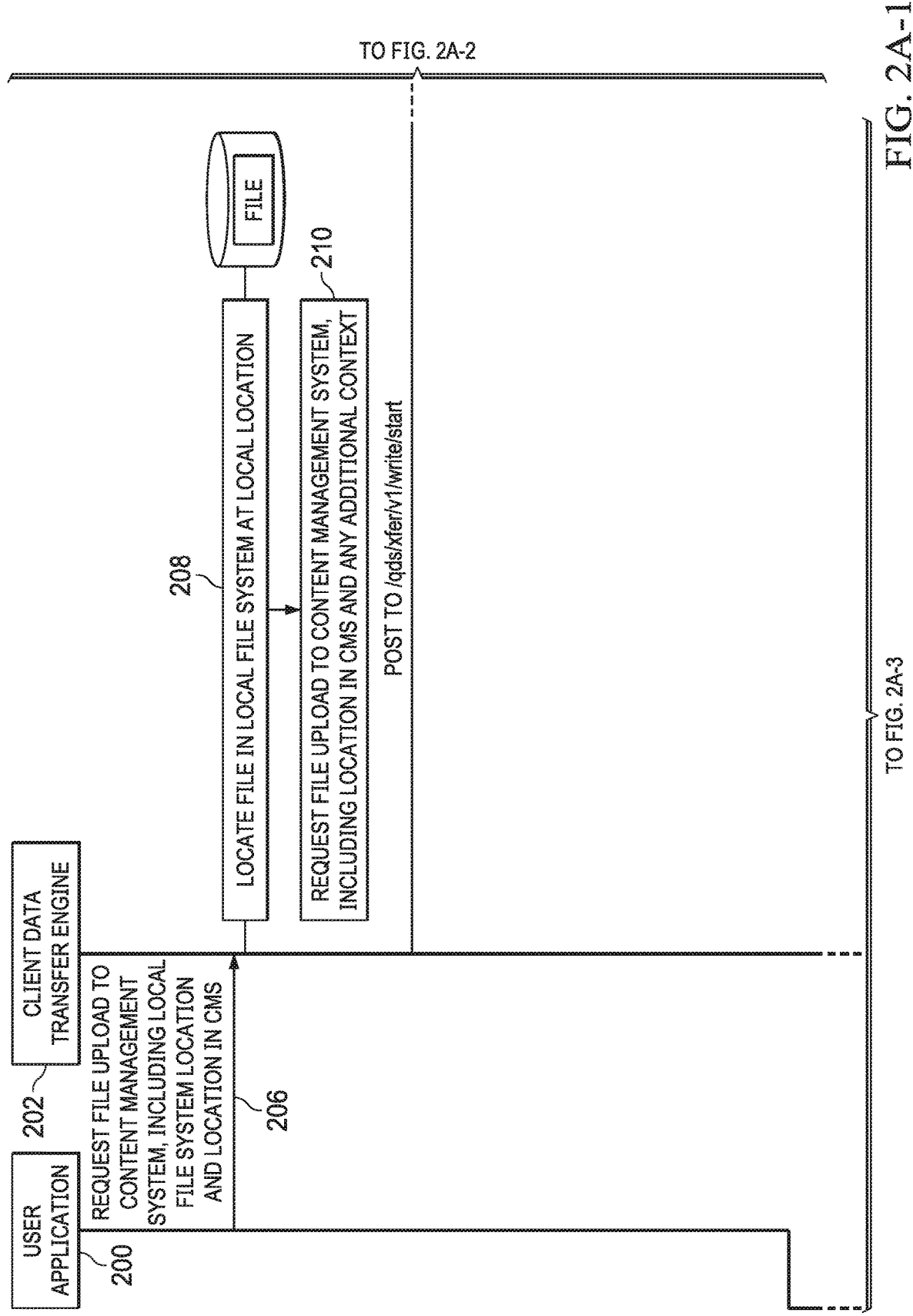

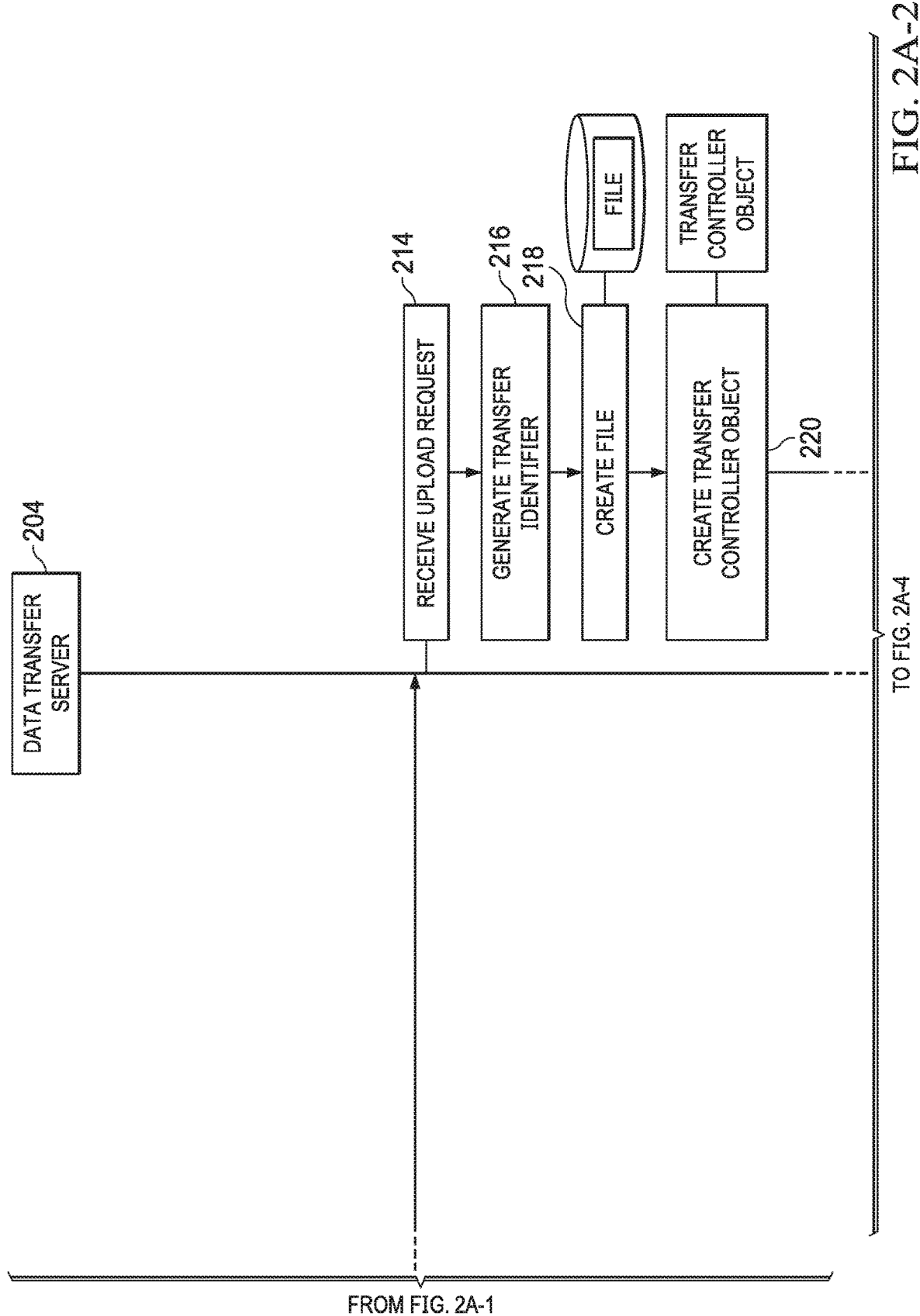

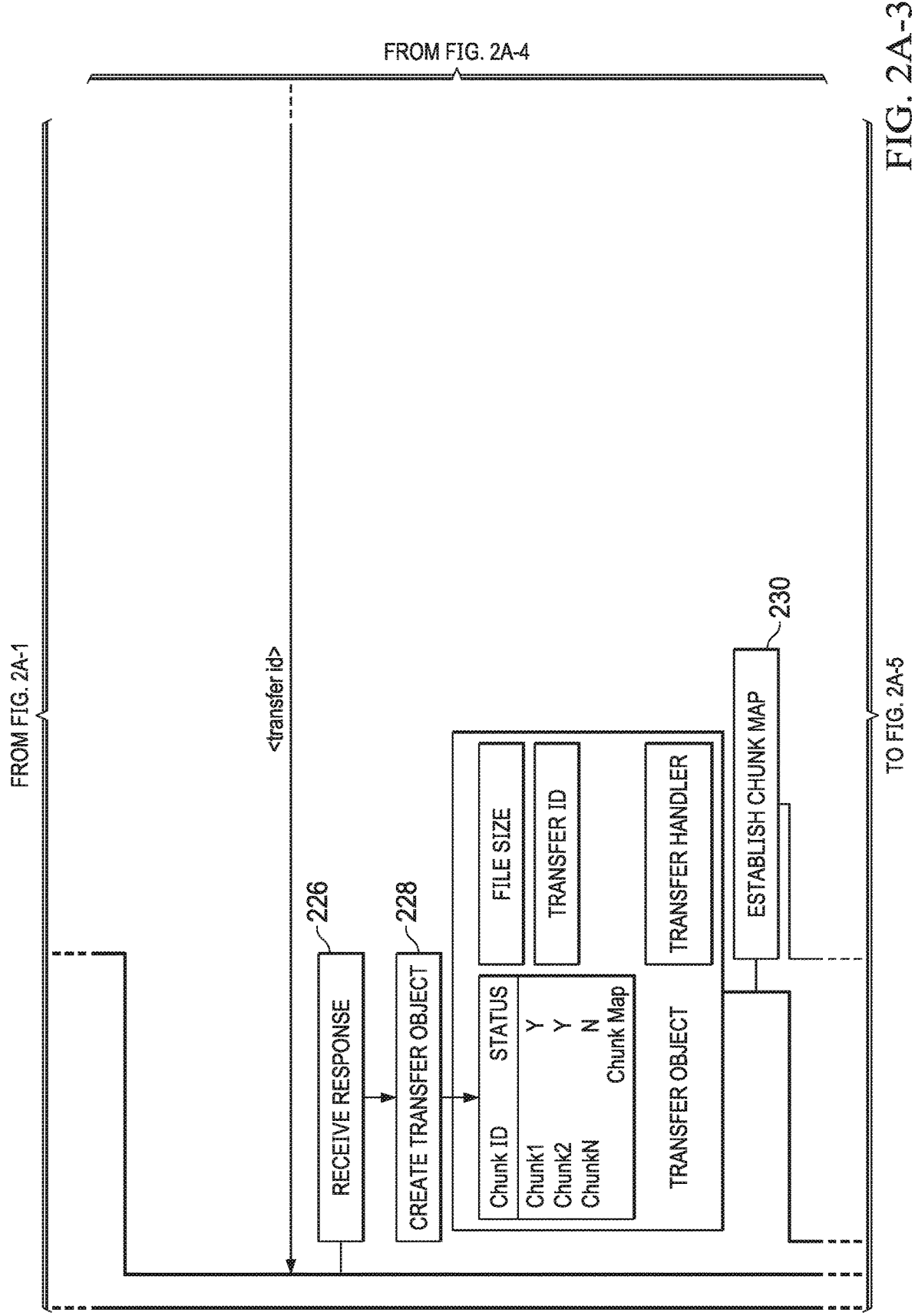

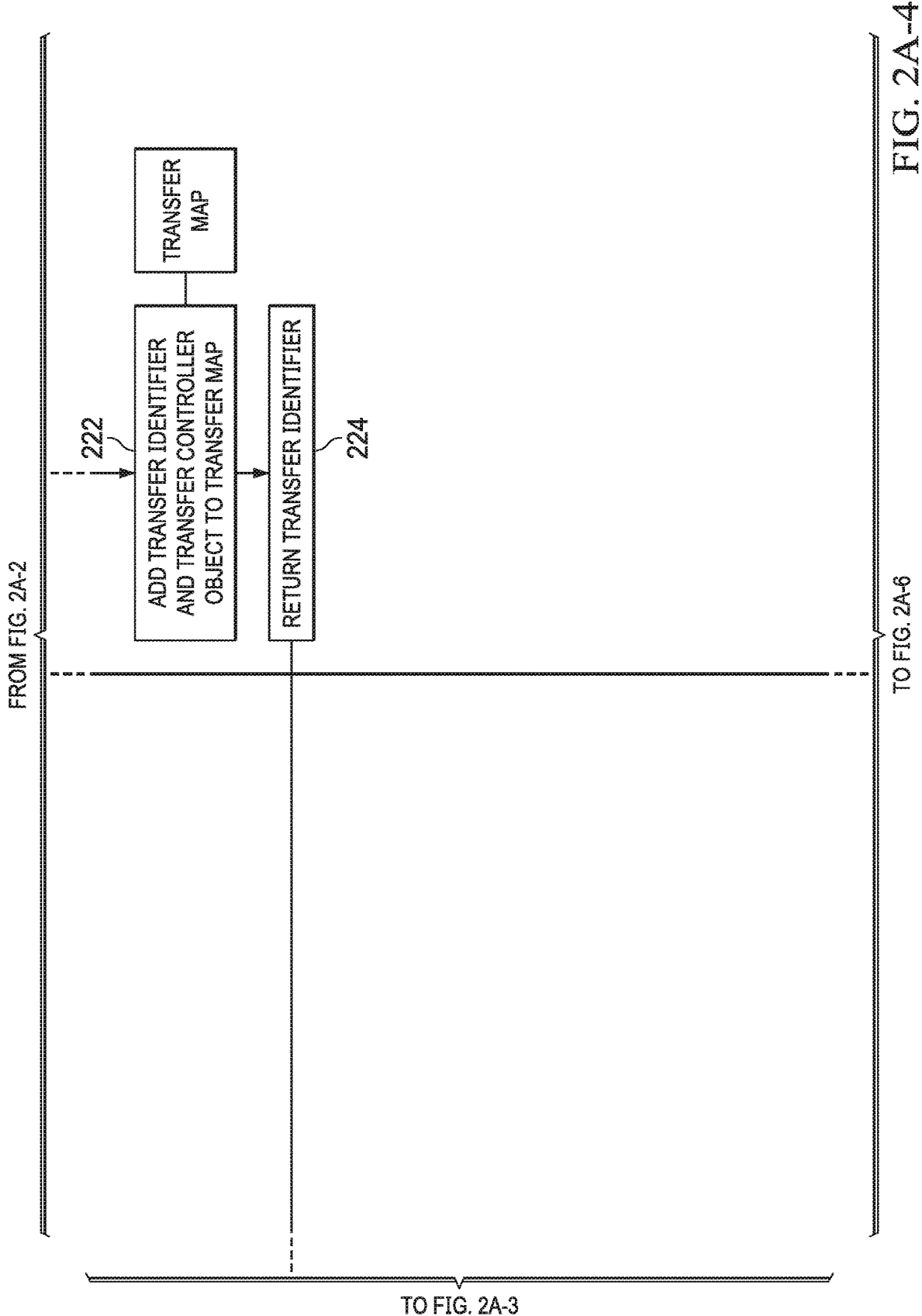

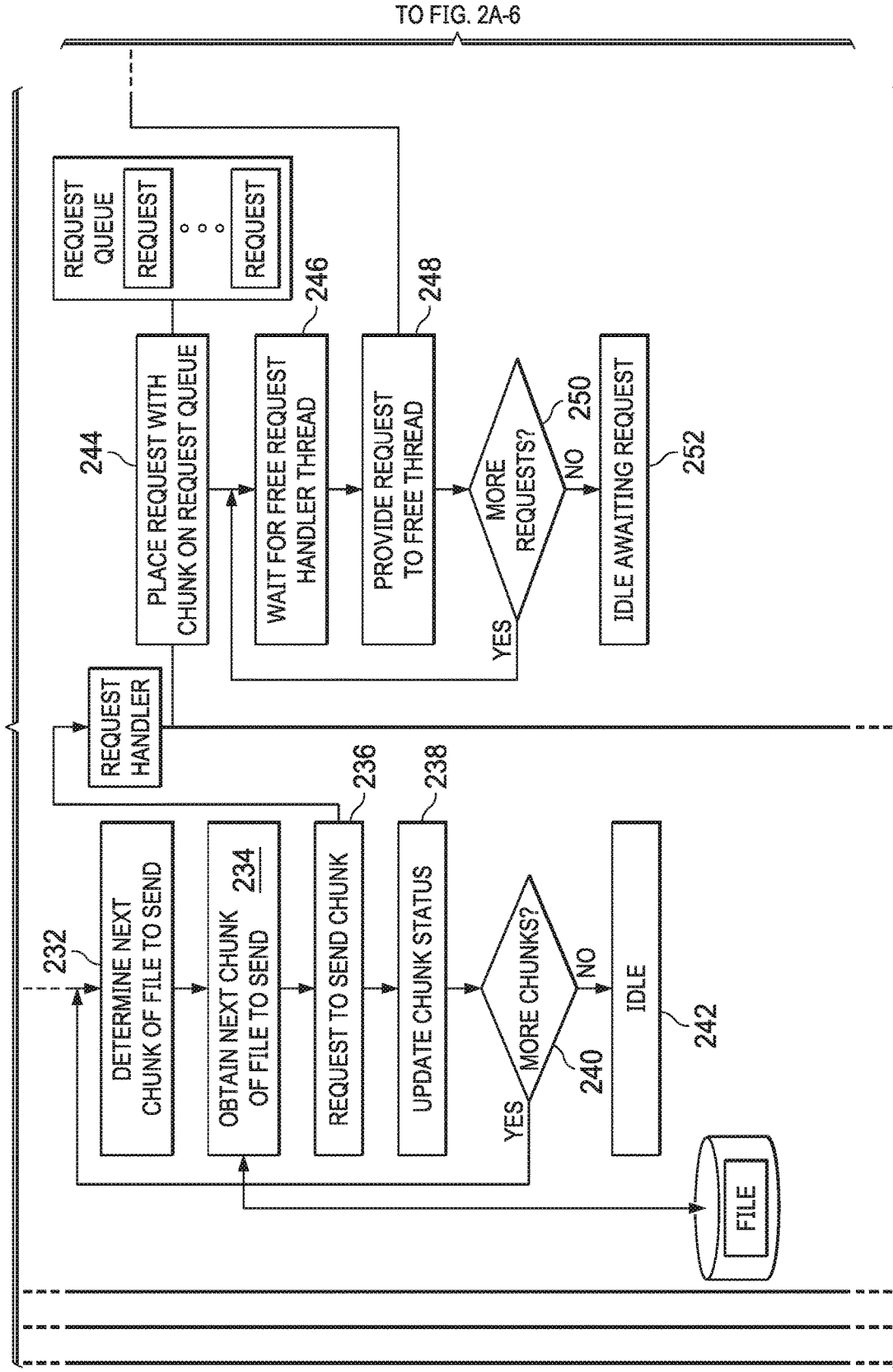

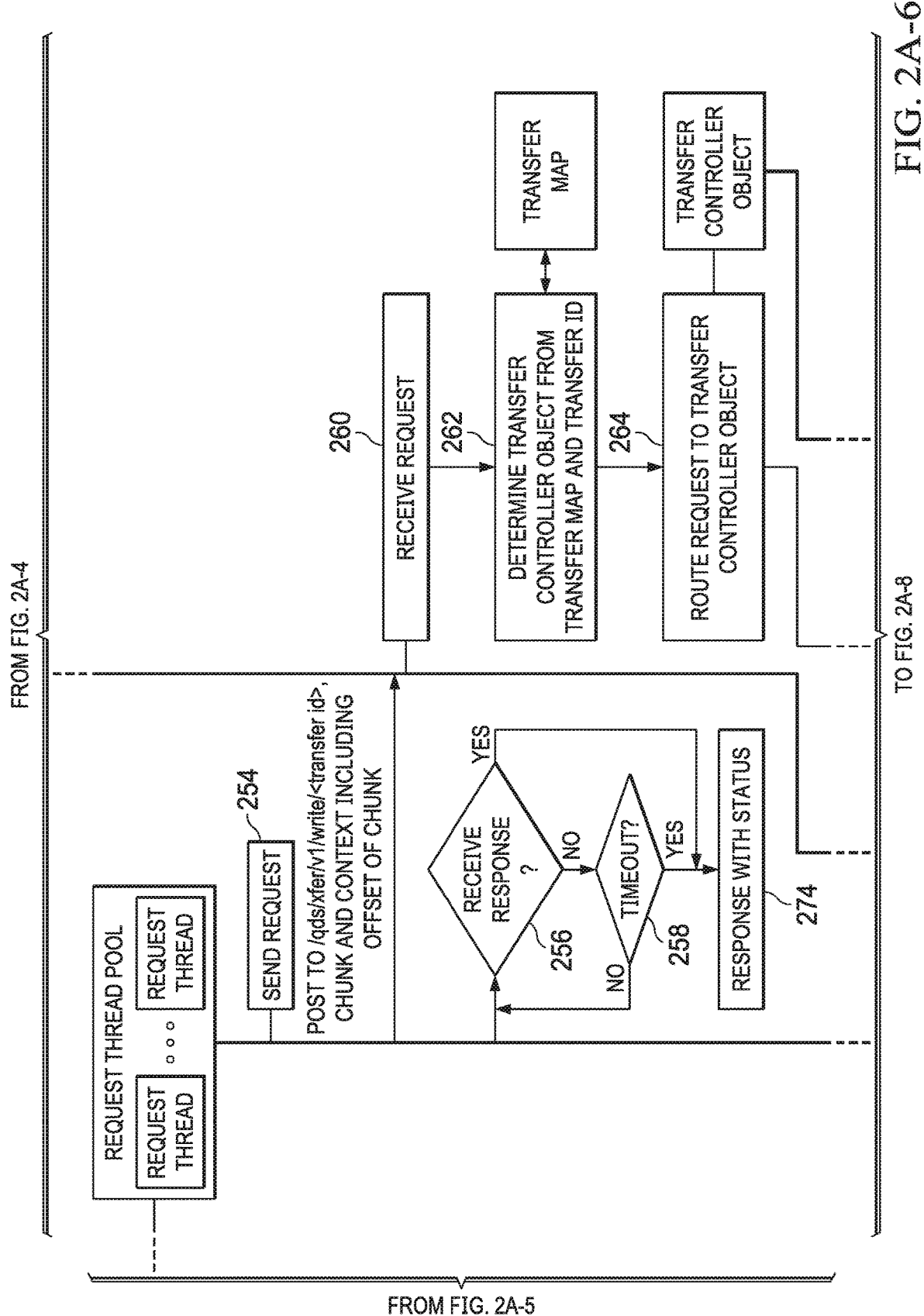

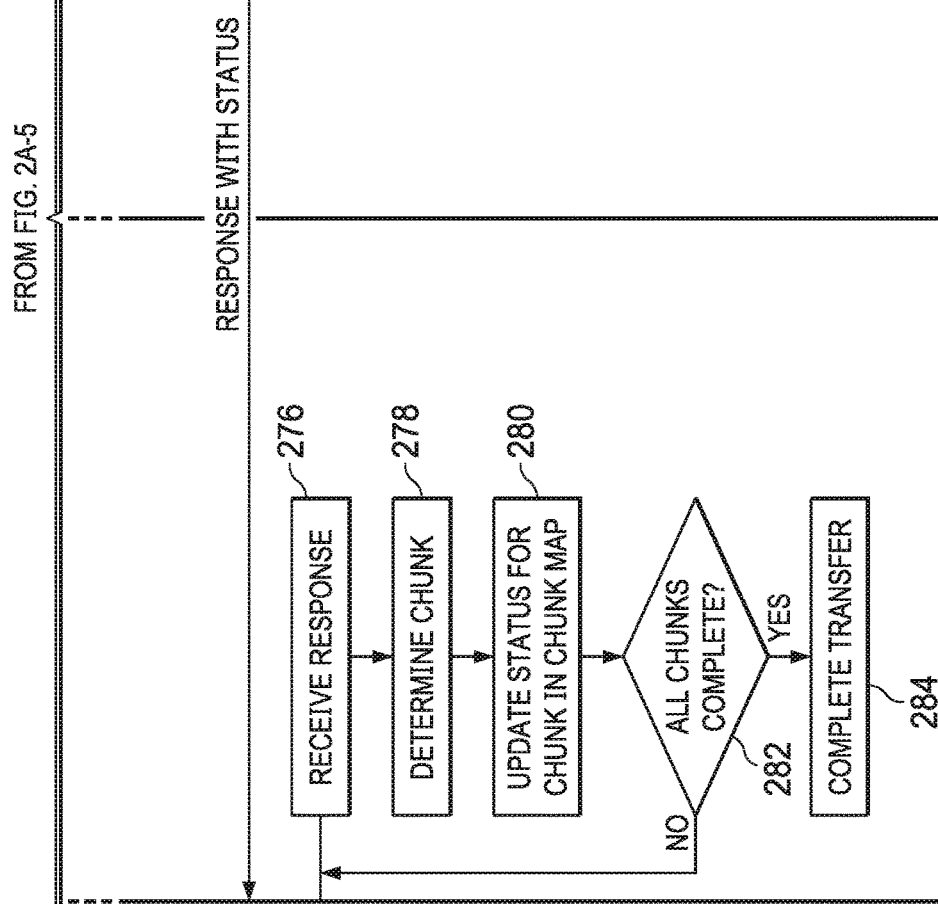

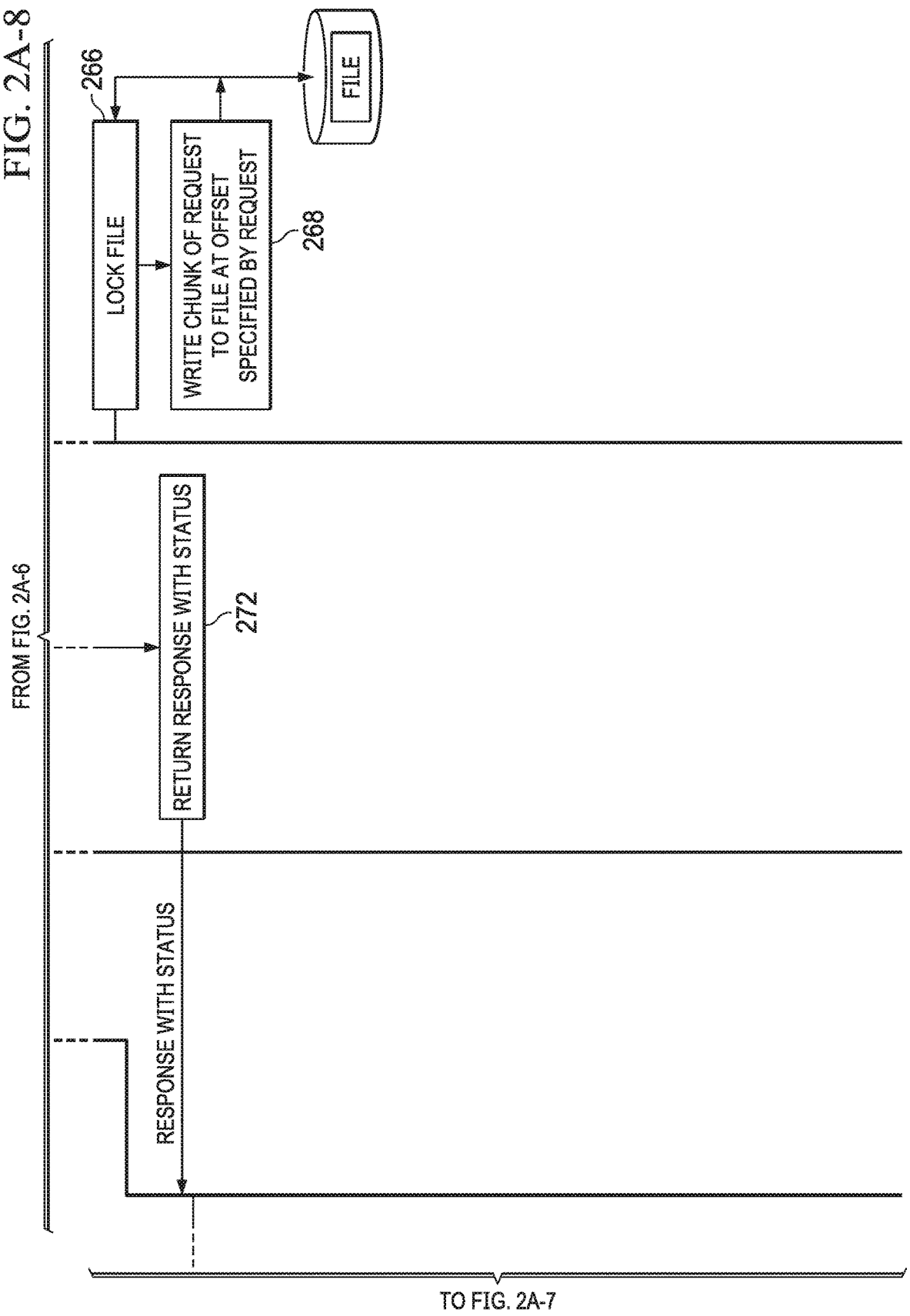

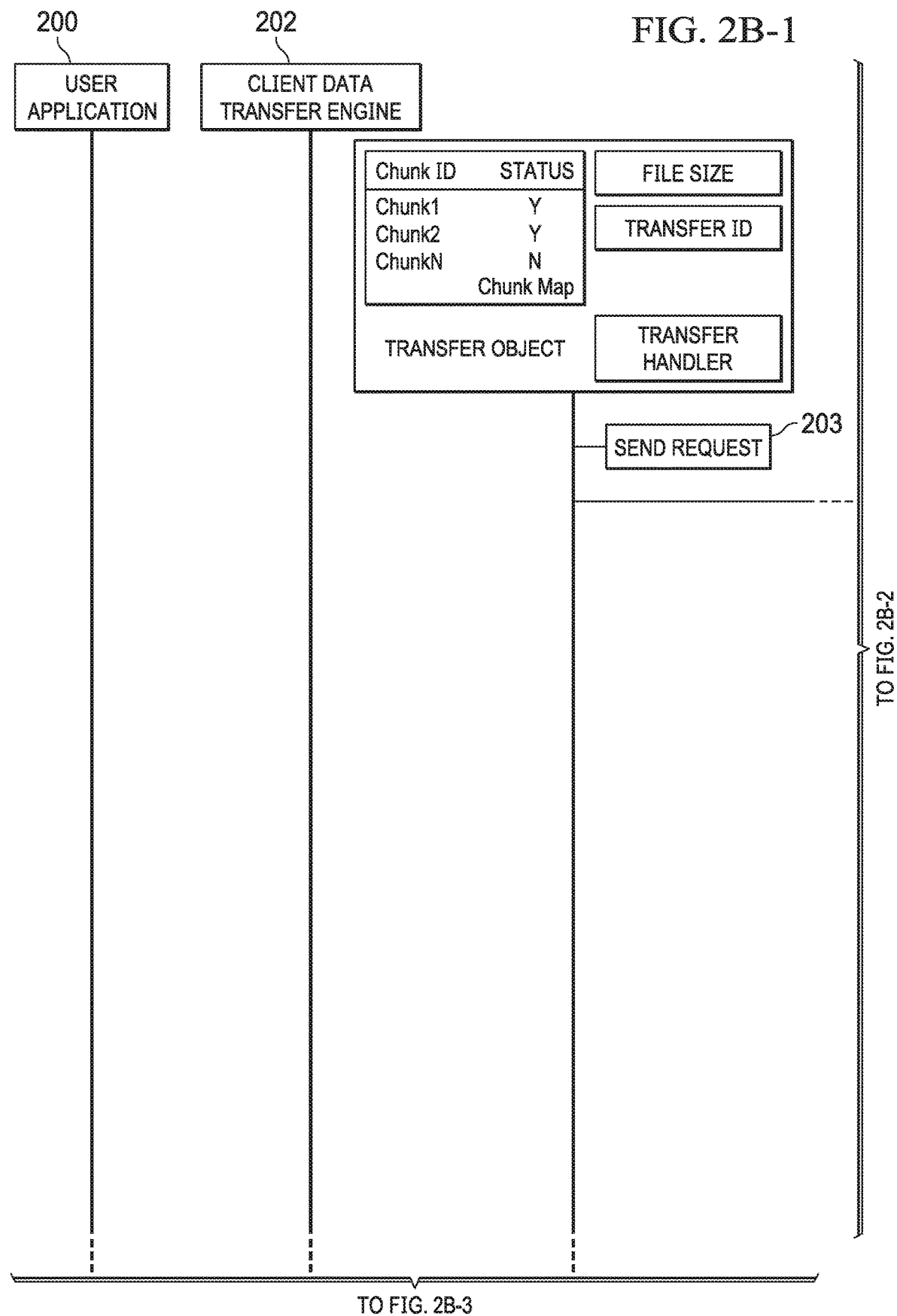

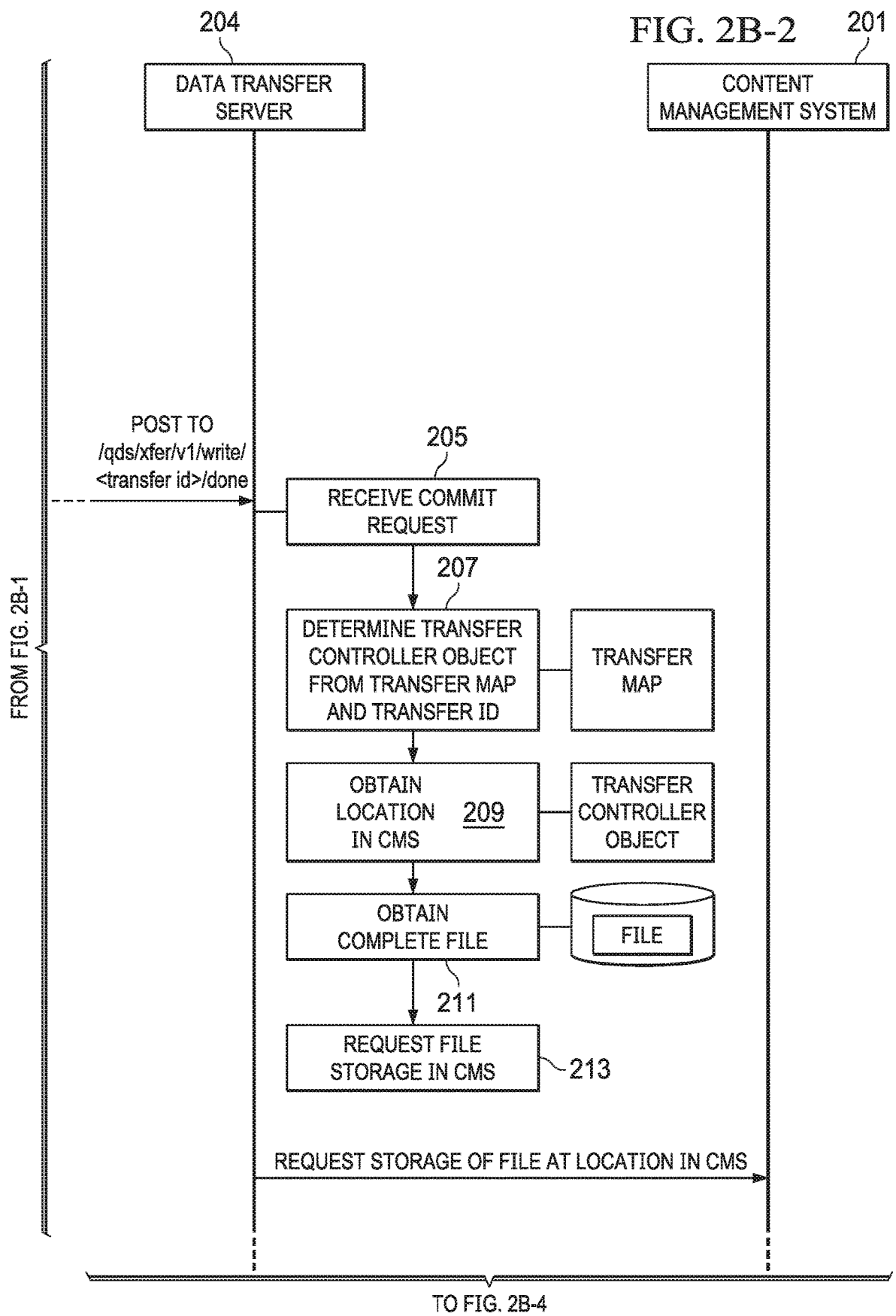

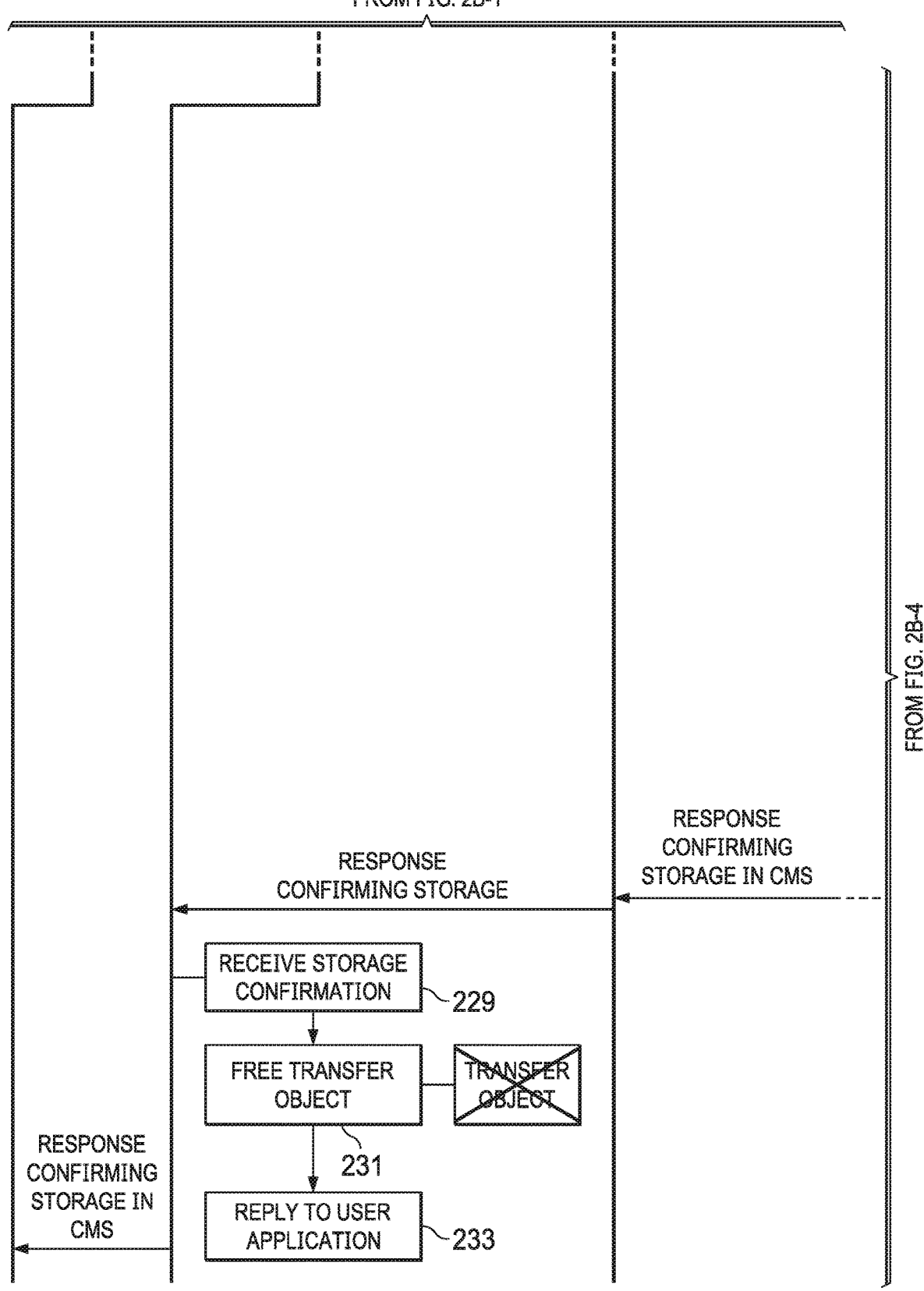

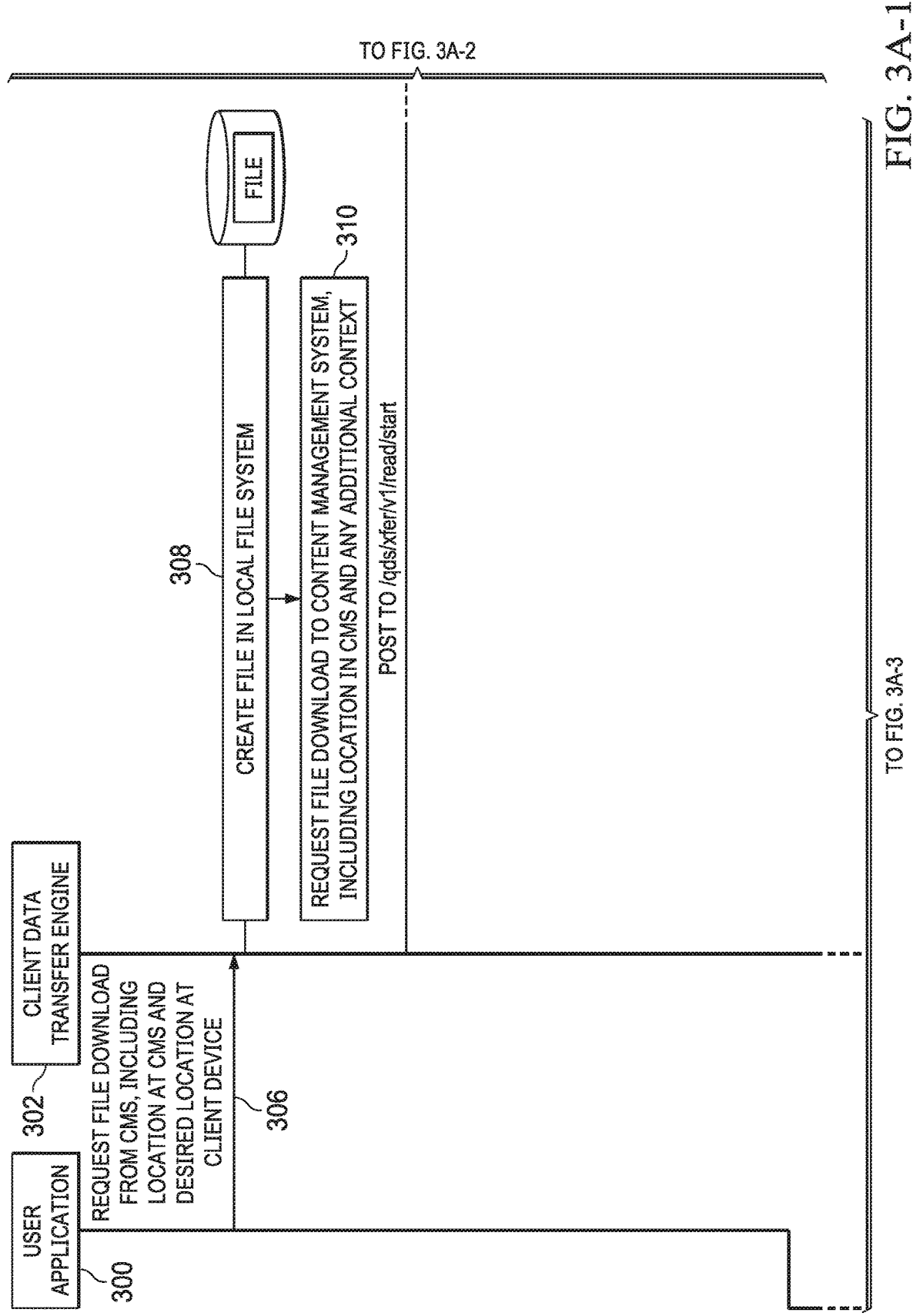

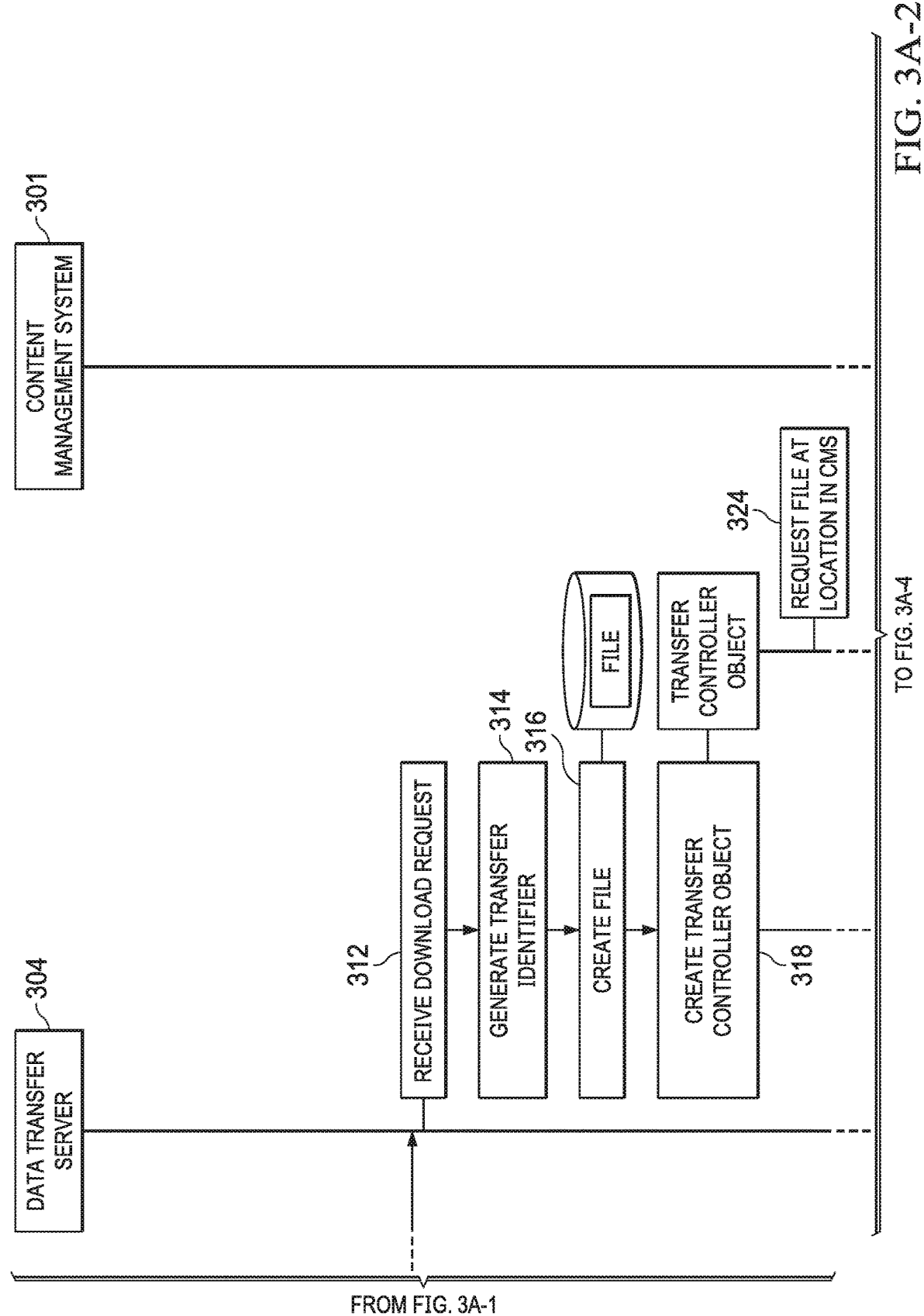

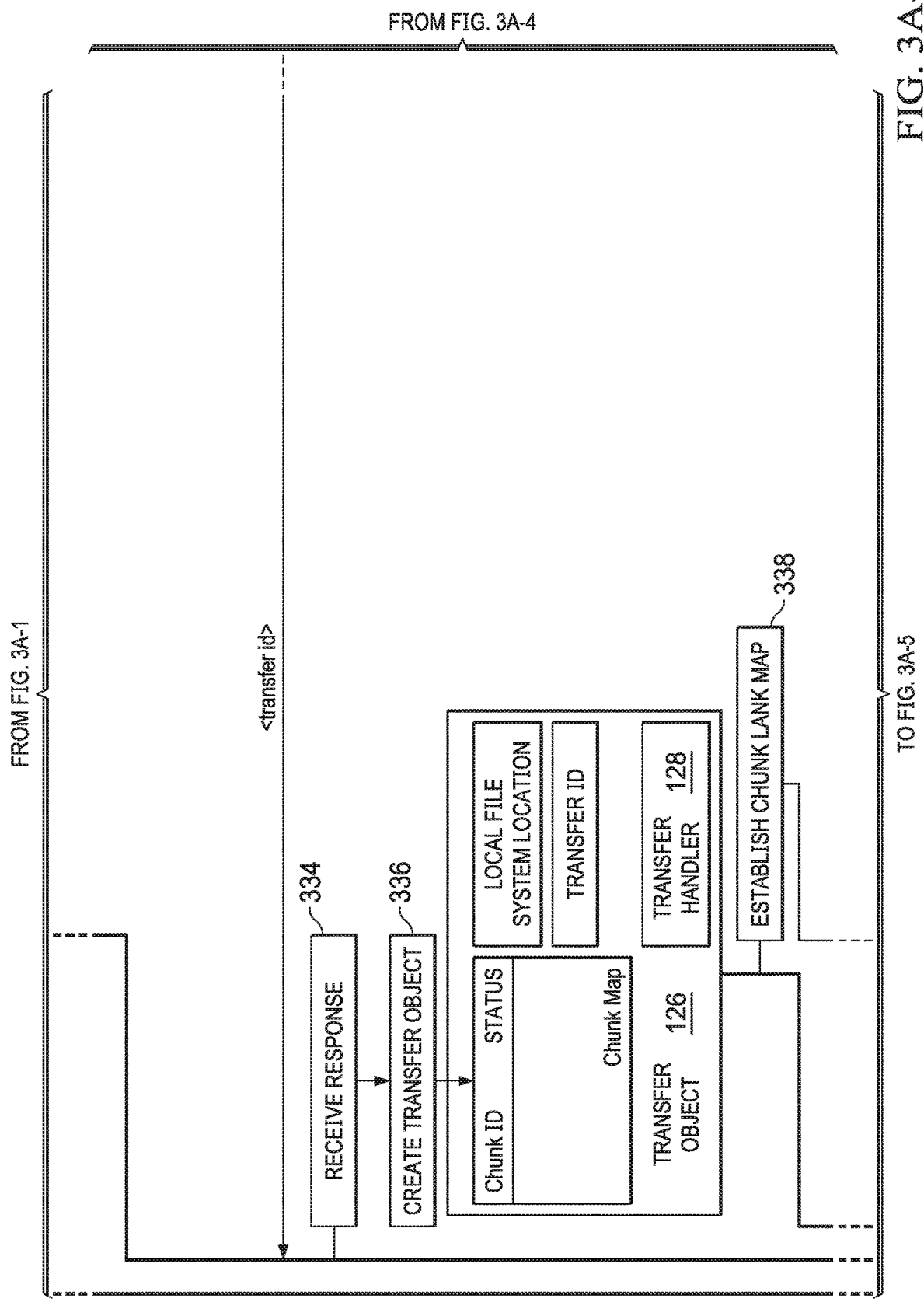

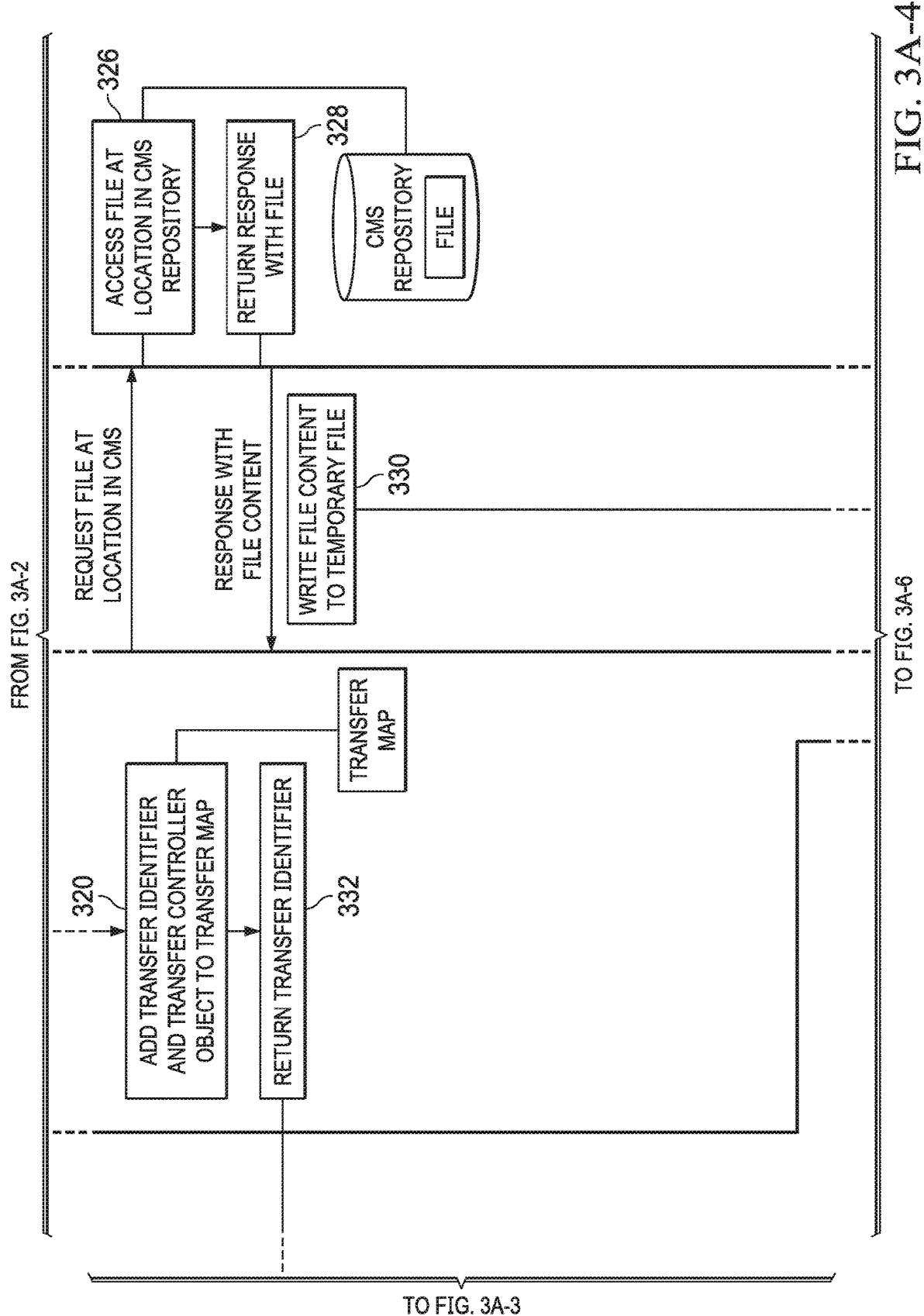

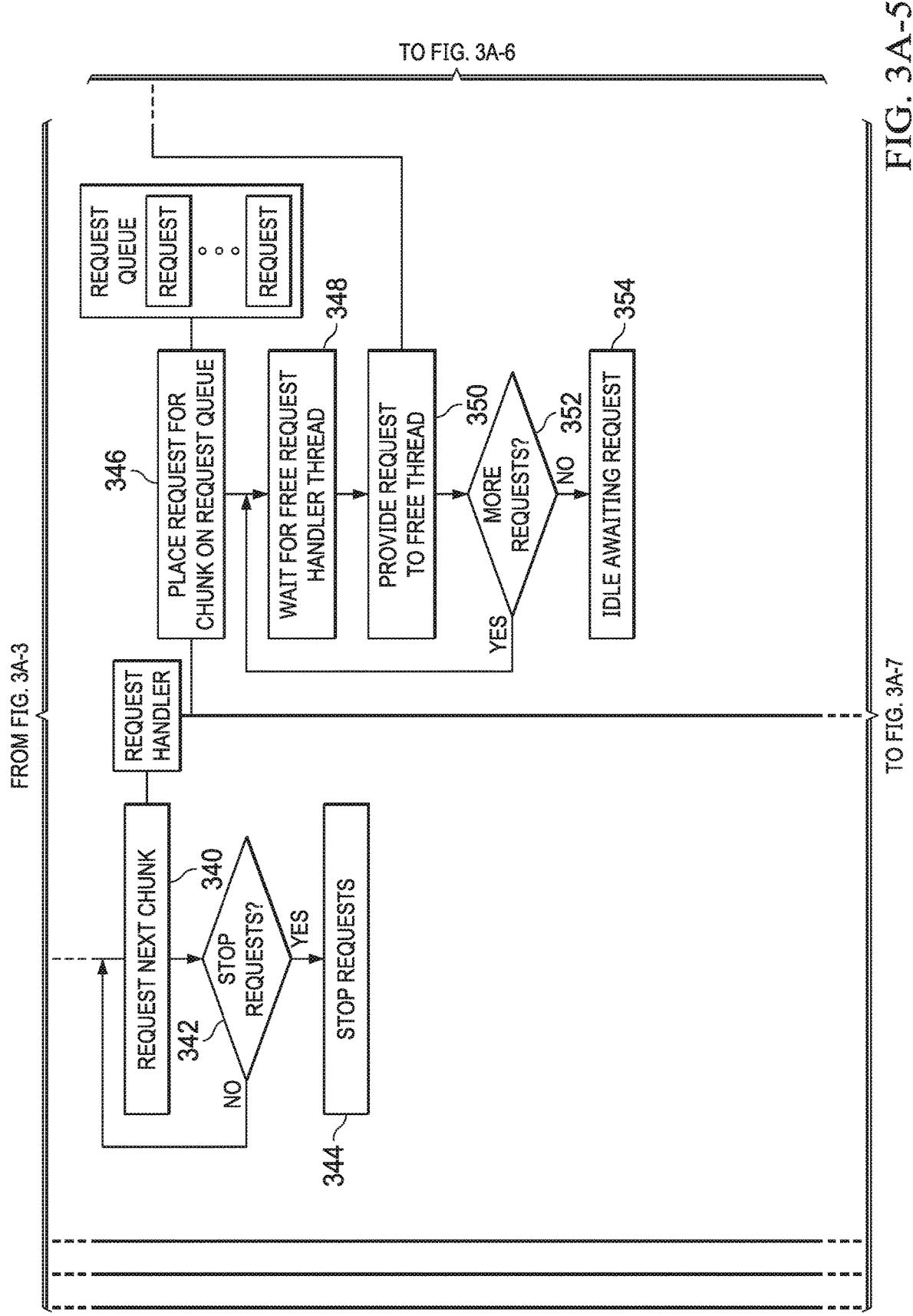

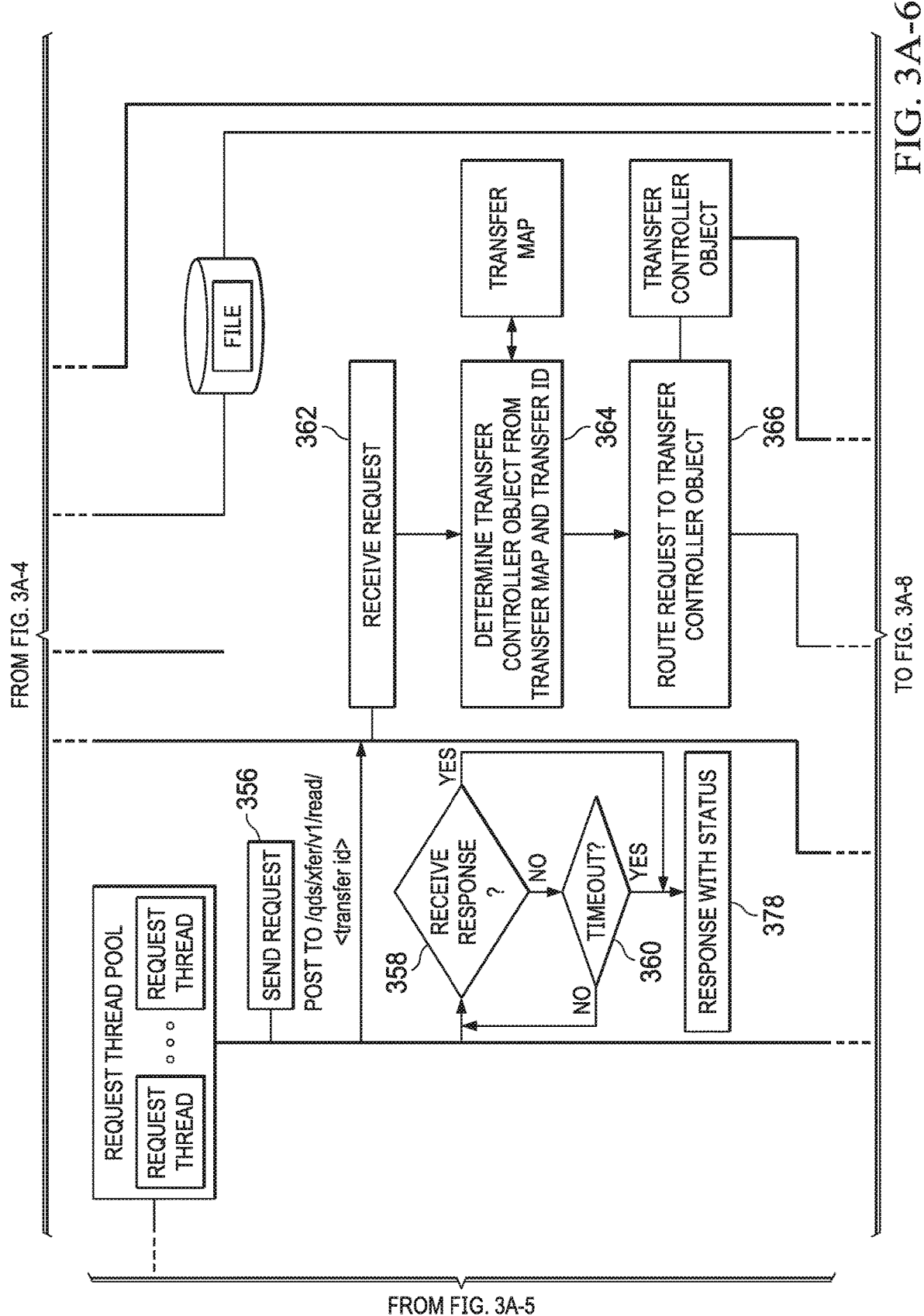

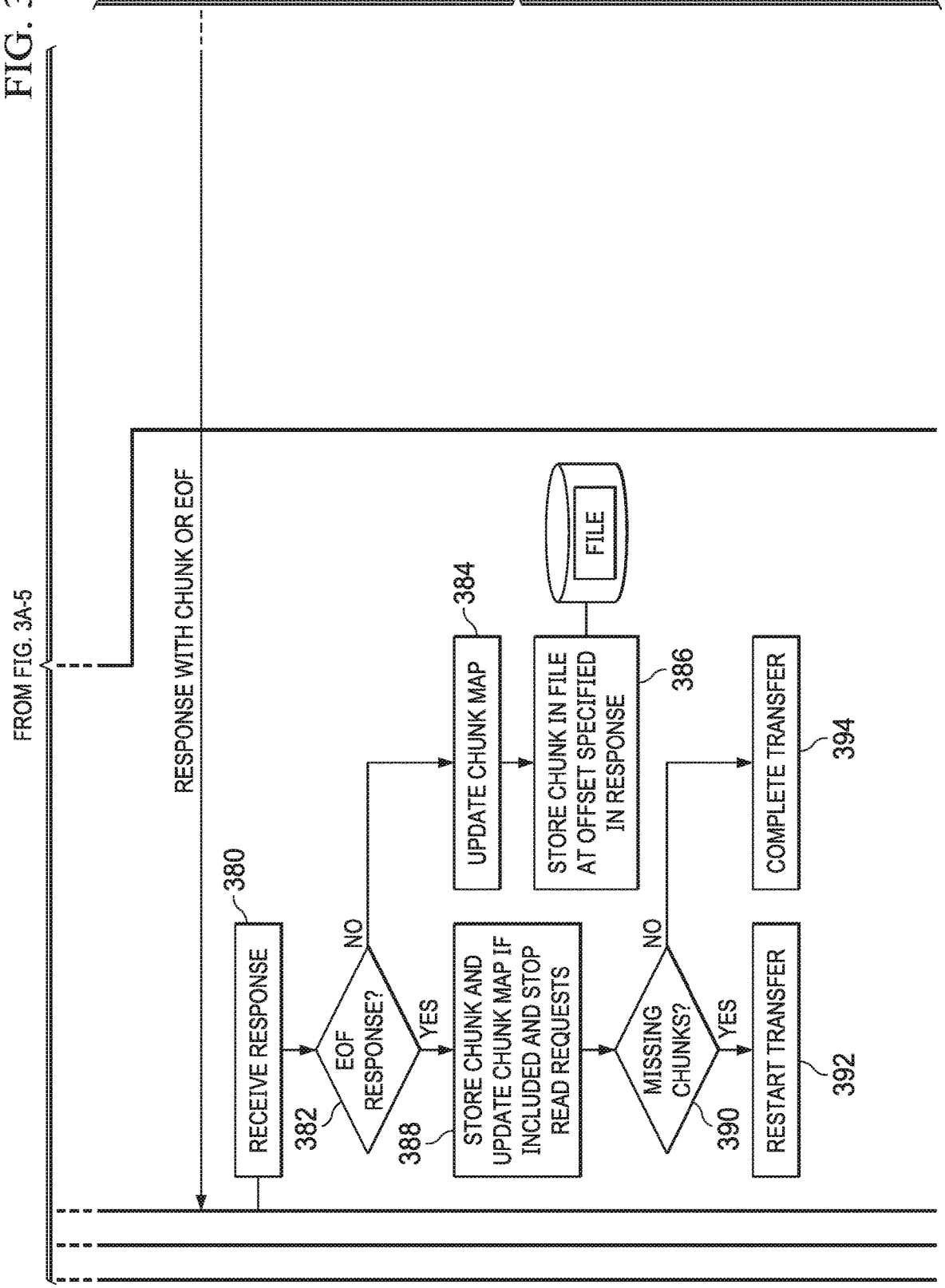

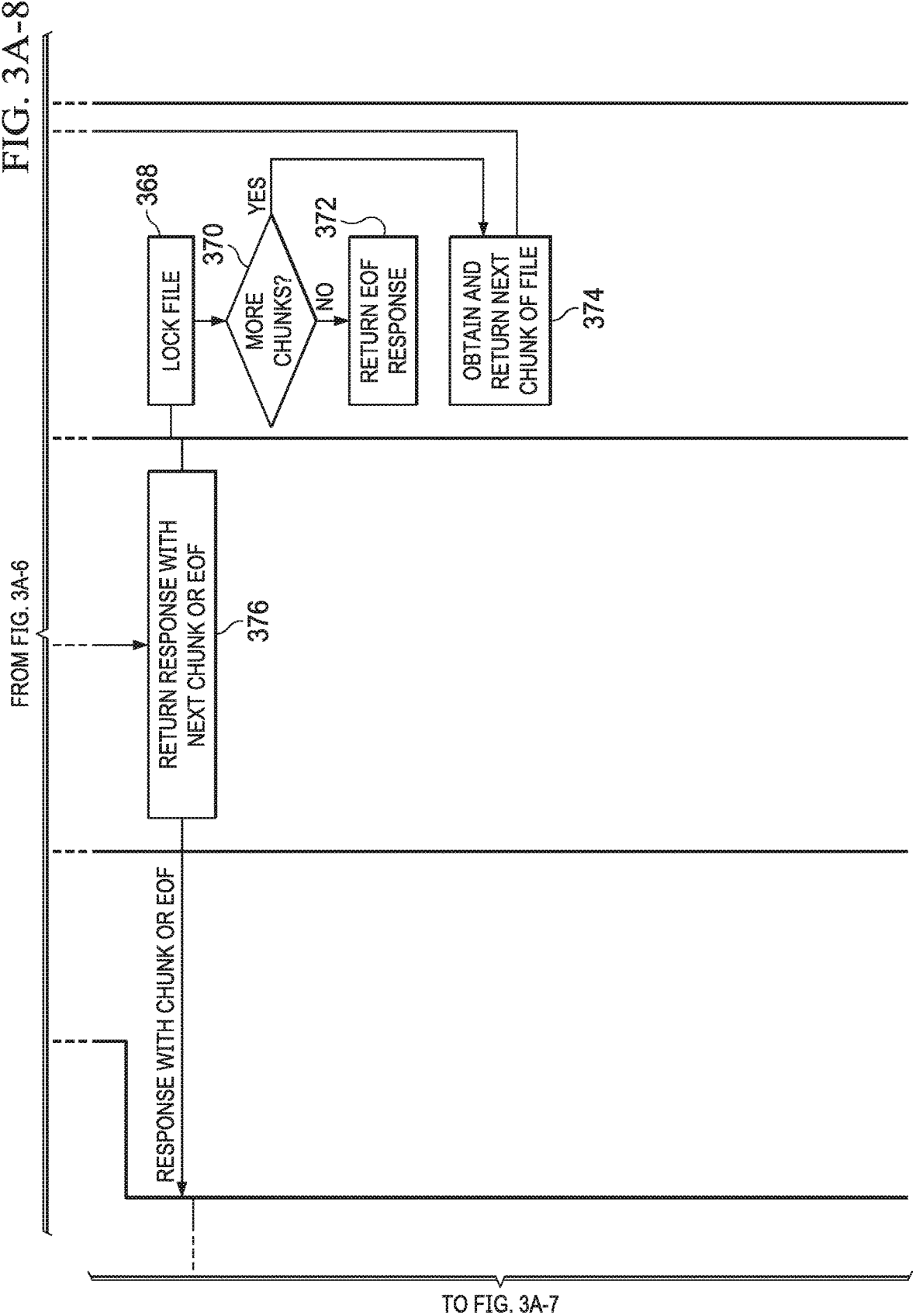

SYSTEM AND METHOD FOR DATA TRANSFER, INCLUDING PROTOCOLS FOR USE IN DATA TRANSFER IN A CONTENT MANAGEMENT ENVIRONMENT

CROSS-REFERENCE TO RELATED APPLICATION(S)

This application is a continuation of, and claims a benefit of priority under 35 U.S.C. 120 from, U.S. patent application Ser. No. 17/349,473, filed Jun. 16, 2021, issued as U.S. Pat. No. 11,516,281, entitled "SYSTEM AND METHOD FOR DATA TRANSFER, INCLUDING PROTOCOLS FOR USE IN DATA TRANSFER IN A CONTENT MANAGEMENT ENVIRONMENT," which is a continuation of, and claims a benefit of priority under 35 U.S.C. 120 from, U.S. patent application Ser. No. 16/547,693, filed Aug. 22, 2019, issued as U.S. Pat. No. 11,070,610, entitled "SYSTEM AND METHOD FOR DATA TRANSFER, INCLUDING PROTOCOLS FOR USE IN DATA TRANSFER IN A CONTENT MANAGEMENT ENVIRONMENT," both of which are fully incorporated by reference herein for all purposes.

TECHNICAL FIELD

This disclosure relates generally to systems and methods for data transfer. Specifically, this disclosure relates to systems and methods for the transfer of data in a networked environment, the reduction of the effects of network latency when transferring data, and the maximization of bandwidth utilization during such transfers. Additionally, this disclosure relates to data transfer in a content management environment between source systems and content management systems.

BACKGROUND

With the increase of networked (both wired and wireless) and distributed computing environments (e.g. the Internet, mobile or cellular networks, office internets or intranets, etc.) the need to transfer data between computing devices has similarly increased. Commensurate with the increased need to transfer this data, the size of the data that it is desired to transfer has also increased. This combination has resulted in undesirable latency issues in the transfer of this data.

More specifically, as the distance of over which it is desired to transfer data increases, the latency of the file transfer may similarly increase due to increased network latency. This network latency may be due to a number of factors such as an increase in the number of hops required for the data transfer, a greater likelihood of network congestion on an intermediary networked, varying capacity on intermediary networks or a whole host of other factors.

To exacerbate the problem, the latency added by the distance of the transferred may be even more noticeable when large amount of data are transferred. For example, a 20 millisecond difference in the transfer speed may not be particularly noticeable when transferring a 2 MB file, however when transferring a 5 GB file such latency may become quite problematic.

While certain solutions to address or reduce the effects of latency issue have been built for specific applications, these solutions usually require certain hardware or software components or rely on the compression of data. However, not all data is compressible and the installation of hardware or particular software modules at one or both ends of a network connection may not always be feasible. Efficient and reliable data transfer is thus desired in a variety of contexts.

A microcosm of this problem occurs in a content management environment. Often times large enterprises or other entities employ content management systems (CMS) to manage their content. Content management system do just that, allowing for the management of such content by controlling the access, editing, updating, versioning, etc. of content. This type of content management is in no way trivial. In certain contexts, such as in an enterprise setting, there may be millions or even billions documents that need to be managed, and users may desire to have access to these documents from a variety of distributed access points.

To facilitate content management in conjunction with such distributed access, content management systems may be organized around one or more content management servers that provide services associated with the management of such content. Content management servers like these may be deployed in the cloud or otherwise distributed.

Using such content management systems then, users may access managed content to, for example, edit such content. To access such content users typically use a user interface (UI) to interface with a content management server of the content management system. In most cases, they reserve (or "check out") the content and download or access it locally on their computer (e.g., referred to as a client). The user can then edit the document, save the changed version to the content management server and unreserve the content.

As all content accessed by users of the content management system may need to be transmitted from the content management system to the user's device, the use of content management systems or other types of central repositories (or more even more generally services architectures) may entail the transfer of a large number of files. As the file being transferred have steadily increased in size as well, the transfer of these files can become problematic for a number of reasons, including for example, network latency or bandwidth issues, error recovery, or security issues, among others.

Accordingly, it is desired to implement effective, reliable, quick, and efficient solutions for data transfer that may, for example, reduce the effects of network latency in data transfers and maximize bandwidth usage while improving reliability or error recovery.

SUMMARY

To continue with the above discussion, efficient and reliable data transfer is desired in a variety of contexts. A particular one of these contexts is a managed content environment. It should be understood here, and throughout the disclosure, that while embodiments herein may be usefully applied in these types of management content environments, and thus will be described in the context of such managed content environments, other embodiments may be usefully applied in other contexts where efficient, speedy and reliable data transfer is desired, and the description of such embodiments in a content management environment herein is done without loss of generality to the applicability of embodiments as described and disclosed herein.

With that being said, content management environments may present some unique difficulties with respect to data transfers on a computer network. Specifically, files of all sizes may be transferred between client devices or applications and content management systems over a network. The transfer of the data of these larger files may be particularly sensitive to the effects of network latency, decreased bandwidth or failed transmissions. In particular, users of such content management systems may transfer multiple large files simultaneously, and a content management system may have to deal with not only these large file transfers from a single user, but from all users across the enterprise, substantially simultaneously. As another concern, many of these content management systems employ security measures to authenticate users or impose access controls on those users. Thus, any data transfer solution must integrate, or be compatible with, these security measures.

Additionally, in many instances an enterprise will employ multiple content management systems in the enterprise environment. Thus, to implement any sort of data transfer solution requires that the solution be implemented with respect to each interface (e.g., user interface or application) for use with each content management system and with each content management server, including any security measures employed by each of the content management systems. This solution becomes somewhat untenable given the number of users in a typical enterprise and the number of applications or interfaces that may utilize each content management system.

Moreover, recent trends have involved the deployment of content management servers in cloud based computing platforms while interfaces for these content management systems are increasingly being provided as web based interfaces or plug-ins. Such deployments greatly increase the cost and complexity of implementing data transfer solutions as any data transfer solution employed for using a managed content environment would need to be integrated with each of these interfaces.

Accordingly, what is desired is effective, reliable, quick, and efficient solutions for data transfer that may, for example, reduce the effects of network latency in data transfers and maximize bandwidth usage while improving reliability or error recovery. Specifically, what is desired are efficient, speedy and reliable data transfer solutions for use in a managed content environment.

To that end, among others, a service based data transfer system is disclosed herein. A data transfer system may include a data transfer server providing a common data transfer interface such as a (e.g., web) services interface that may be called by a client device to transfer data files to (e.g., upload), or retrieve data files from (e.g., download) a particular content management system. This common data transfer interface may operate according to an established transfer protocol such as HyperText Transfer Protocol (HTTP) or HTTP Secure (HTTPs)) and may be, for example, be a Representational State Transfer (REST) interface. These client devices or application may be any devices or applications associated with users (either human, machine or software) of a content management system and will be collectively referred to herein as client devices without loss of generality.

Such a request for a data transfer from a client device may therefore include, for example, contextual data for the data transfer such as a location associated with the content management system where a data file is to be stored or from where the data file it to be retrieved. If security or authentication of a user is required by the content management system, authentication credentials for a user such as a token or the like may be also passed with the request as part of the contextual data of the request.

During a file upload the file can be transferred from the requesting client device to the data transfer server through the data transfer interface of the data transfer service. In some embodiments, this transfer may take place using a set of chunks of data from the file being transferred. Using a connector adapted to interface with an interface offered by the particular content management server any needed security or authentication may be accomplished between the data transfer server and the content management system. The file can then be transferred to the content management system through the connector at the data transfer server.

Similarly, during a download, after any needed authentication is accomplished through the connector for the particular content management server from which the file is being retrieved, the file itself may be retrieved from the content management system through the connector by the data transfer server and stored at the data transfer server. The data transfer server can then return the retrieved file to the requesting client device. Again, this transfer may take place using multiple transfers, each transfer including a chunk of data from the file being transferred.

The data transfer server may have an extensible connector architecture such that connectors adapted for different content management systems may be utilized. Thus, client devices may transfer files to or from different types of content management systems using the common data transfer interface of the data transfer server. The data transfer server can then accomplish the transfer of the file to or from the content management system through the appropriate connector for that content management system. This architecture allows client devices to interact with a single interface to accomplish data transfer regardless of the interface employed by the content management system.

Embodiments of the data transfer system may additionally employ a client data transfer engine that is deployed at a client device. The client transfer may initiate the transfer of a data file. Specifically, in one embodiment, the client data transfer engine may be incorporated into a particular user interface application for a content management system (e.g., be a module, function, plug-in etc. of a user interface application). In these types of embodiments, when a user initiates a file transfer with a content management system the user interface application may pass the contextual information associated with the transfer (e.g., location on the local file system, location at the content management system, user authentication data, etc.) to the client data transfer engine to accomplish the transfer of the file.

In some instances, the user interface may determine the size of the file to be transferred (e.g., by touching the file when it is stored on the local file system of the user device or by communicating directly with the content management system to determine the size of the file), and will initiate the file transfer using the client data transfer engine only when the size of the file is greater than a threshold size (e.g., 1 MB, 10 MB, 20 MB, 100 MB, twice the chunk size, three time the chunk size, etc.). If the size of the file is below the threshold the content management system user interface may transfer the file directly between the user interface and the content management system. In this manner, transfers using the data transfer system may be confined to only files of a certain size, speeding the transfer of these files.

Embodiments of a client data transfer engine may also be a standalone application or plug-in on a client device. For example, in cases where the user interface for a content management system is a web based application accessed through a browser, the client data transfer engine may, for example, be a plug-in of the web browser. In these types of embodiments, the client data transfer engine may offer a data transfer engine application interface such as an Application Programming Interface (API), a Representational State Transfer (REST) interface on another type of interface that may be utilized by a user interface application. By implementing the client data transfer engine as a standalone application or plug-in on a client device, where the client data transfer engine provides a client data transfer engine application interface, multiple different user interfaces associated with multiple different content management systems (e.g., on a client device) may utilize the same data transfer system through the client data transfer engine application interface provided by the client data transfer engine.

Here, when a user initiates a file transfer with a content management system through the user interface, the user interface application may initiate the data transfer by calling the client data transfer engine application interface of the client data transfer engine to pass the contextual information associated with the transfer to the client data transfer engine to accomplish the transfer of the file. As the user may have authenticated directly with the content management system through the user interface at some previous point, the user interface may have any needed authentication credentials or headers for the user (e.g., token or the like) available and accessible to be passed to the client data transfer engine with such contextual information. Again, the user interface may only initiate the file transfer using the client data transfer engine application interface when the size of the file is greater than a threshold size.

When a data transfer is initiated through embodiments of a client data transfer engine on a client device, the client data transfer engine may request the data transfer of a specified data file using the common data transfer interface of the data transfer server (e.g., may send a request to the data transfer server through the interface), specifying whether the transfer is for an upload or a download of data and providing the contextual data for the data transfer, including a location associated with the file to be transferred in the content management system, a chunk size to use, or any needed user authentication information. Additionally, in the case of a file to be downloaded from the content management system, the client data transfer engine may create a file on the client device for storage of the downloaded file.

In response to the request for the data transfer, the data transfer server may generate a transfer identifier to be used for the data transfer and return the data transfer identifier to the requesting client data transfer engine. The data transfer server may also create a temporary file for the data transfer at the data transfer server. This temporary file can be, for example, associated with the transfer identifier generated for the data transfer.

In the case of the initiated data transfer being a download of a file from the content management server, the data transfer server may access the content management server through the appropriate connector associated with that content management system to access the file at the specified location on the content management system (e.g., as passed in the request) and store the file in the temporary file at the data transfer server. This may, for example, a streaming operation such that the requested file is streamed from the content management system to the data transfer server (e.g., through the appropriate connector associated with that content management system).

The client data transfer engine can then manage the transfer of the file to or from the client device. In one embodiment, the data file may be transferred as a set of chunks of a configured constant size. This chunk size may be a size that can be reliably transferred under almost any operating circumstances, but is still small enough to allow concurrent transmission with a significant proportion of data files encountered in typical operation. The chunk size may be, for example, 2 MB, 4 MB or the like.

The chunks of a file can be retrieved or sent by the client data transfer engine using a set (also referred to as a pool) of request threads. These threads may each be adapted to send a request to the data transfer server for a chunk of the file using the interface (e.g., the HTTP or HTTPS interface) provided by the data transfer server and may be adapted for handling all requests for data transfers conducted by the client data transfer engine at the client device. In certain embodiments, there may be a pool of requests threads (e.g., 8, 16 or 32 threads) where each of the request threads owns or is associated with a corresponding HTTP request channel. In this way, multiple chunks of the data file (or multiple data files) may be transferred concurrently over HTTP.

The client data transfer engine is thus the "bookkeeper" the data transfer. It has a map (e.g., in memory) that notes, for example, the size of the file, how many chunks there will be, whether those chunks have been transferred, whether those transfers are completed (the status of ongoing transfers, etc.). The status of each chunk of file can include whether the chunk has been sent or whether a response has been received and can be used to track the transfer. Whenever a new chunk can be sent the client data transfer engine checks the status of the chunks to determine which one to send. The client data transfer engine sends and marks chucks as transferred. When a response is received from the data transfer server, (e.g., failed or successful) the status associated with the chunk can be updated.

In particular, in one embodiment, the client data transfer engine may maintain a chunk map for the data transfer of the data file being transferred. The chunk map may comprise an ordered set of entries for each chunk that comprise a data file including an identifier for each chunk of the data file being transferred, an offset (e.g., in bytes) of that chunk from the beginning of the file (e.g., byte 0) and a status of that chunk. The status may be a binary status indicated transferred or not transferred, or may have three states: sent, unsent and completed. Other states are possible.

In the case of an upload of a data file from the client device, the client data transfer engine may therefore have access to the file or the characteristics of the data file at the client device. The client data transfer engine can thus establish a chunk map for the data transfer that references each chunk of the data file at the time the transfer of the data file is initiated by the user interface application by referencing the size of the data file to be transferred and determining the set of chunks and corresponding offsets that comprise the data file.

However, in the case of a download the client data transfer engine may not a priori be aware of the size of the data file being transferred (e.g., be because the data file is resident at the content management server). In this case, the client data transfer engine may establish a chunk map for the data transfer, where the chunk map may be dynamically updated with the set of chunks as the existence of those chunks can be determined from responses from the data transfer server.

Accordingly, in one embodiment, during an upload of a data file to the content management system, the client data transfer engine may substantially asynchronously or continuously reference the chunk map, determine a first chunk of the data file that has not been transferred (e.g., has not been sent or completed), obtain that data of that chunk from the data file starting at the offset specified in the chunk entry for that chunk in the chunk map, and request the transfer of that chunk using the set of request threads.

When a request thread is free, the chunk may be sent to the data transfer server by sending a request (e.g., an HTTP request) to the common data transfer interface of the data transfer server on the HTTP channel associated that request thread. The request to the common data transfer interface may indicate an upload of a chunk and include the transfer identifier assigned by the data transfer server, the data (e.g., the binary data) of the chunk, the length of the data being transferred and the (e.g., starting byte) offset of that chunk within the data file being transferred.

When the data transfer server receives such an upload request at the common data transfer interface, the data transfer server may utilize the transfer identifier included in the request to locate the temporary file at the data transfer server associated with the data transfer and write the data of the chunk received in the request into the temporary file at the offset specified in the request. The data transfer server can then send a response to the received request back to the client data transfer engine indicating that the chunk has been received (or, if there was a problem, that the transfer of the chunk has failed). When the client data transfer engine receives the response, the client data transfer engine may access the chunk map associated with the data transfer and update (if needed) the entry in the chunk map for the chunk associated with the received response indicating it has been transferred (or update the entry to indicate the chunk is untransmitted).

Using the chunk map for the data transfer then, and the status associated with each of the chunk entries on the chunk map, the client data transfer engine can detect that all the chunks of the data file have been transferred to the data transfer server. When this determination is made, the client data transfer engine may commit the file to content management system and close the data transfer by sending a transfer done request with the transfer identifier to the common data transfer interface of the data transfer server.

When the data transfer server receives this commit request from the data transfer client, the server commits the transferred file at the temporary file associated with the transfer identifier to the content management system at the location associated with the file to be transferred in the content management system. Specifically, the data transfer server may access the content management system using an interface provided by the content management system through the connector for that particular content management system and, through the connector for that content management system, use the interface of the content management system store the file to the location at the content management system specified in the initial data transfer request.

The data transfer server (e.g., once it receives a response indicating the file has been stored at the location on the content management system through the associated connector) can respond to the commit request from the client data transfer engine. In some instances, the client data transfer engine may instead poll the data transfer server using the transfer identifier to determine if the transfer of the file to the content management system has been completed. Once the data transfer is completed the data transfer server can remove the temporary file and any other objects associated with the data transfer at the data transfer server and the client data transfer engine may respond to the user interface application at the client device that initiated the data transfer indicating the transfer has been successful.

Similarly, in one embodiment when a download of a file from the content management system is initiated, the client data transfer engine may substantially asynchronously or continuously request the transfer of a next chunk using the set of request threads.

When a request thread is free, a chunk may be requested from the data transfer server by sending a request (e.g., an HTTP request) to the common data transfer interface of the data transfer server on the HTTP channel associated that request. The request to the common data transfer interface may indicate a download of a chunk and include the transfer identifier assigned by the data transfer server. Here, as the client data transfer engine may not, a priori, be aware of the size of the file being transferred (e.g., and similarly the number of chunks to be transferred), the request may not be for a particular chunk (e.g., may not specify a particular offset of the chunk). Thus, there may be many parallel requests for chunks of the file over the request threads of the client data transfer engine.

When the data transfer server receives a download request for a chunk at the common data transfer interface, the data transfer server may utilize the transfer identifier included in the request to locate the temporary file at the data transfer server associated with the data transfer and a current location pointer associated with the data transfer maintained by the data transfer server. If the location pointer indicates that the end of the file has been reached (e.g., all chunks of the file have been transferred), the data transfer server can send a response to the received download request back to the client data transfer engine with an end of file (EOF) marker or indicator. Otherwise, using the current location pointer the data transfer server can obtain a chunk of the configured size from the temporary file associated with the transfer beginning at the current location and update the current location pointer. The data transfer server can then send a response to the received download request back to the client data transfer engine with the chunk and the length of that chunk or the offset (e.g., beginning byte) of that chunk within the data file. In one embodiment, if the chunk being transferred is the last chunk of the file this response may also include an EOF indicator.

When the client data transfer engine receives the response, the client data transfer can determine if the response includes EOF indicator or includes data for a chunk. If the response includes data for a chunk, the client data transfer engine may write the chunk data into the temporary file at the client device associated with the transfer at the offset specified in the response. The client data transfer engine may also update the chunk map associated with the data transfer based on the response and the offset included therein. This update may entail the determination and creation of entries for sets of chunks that may exist or have been received, the updates of associated offsets of the creation or update of the status associated with one or more chunk entries indicating a chunk has been received or not.

If the response includes an EOF indicator the issuing of requests for the data transfer may be stopped. The completion of outstanding requests (or a certain amount of time) may be waited and the chunk map checked to determine if any of the chunks for the file being transferred have not been received based on the status of the entries in the chunk map. Using the chunk map for the data transfer then, and the status associated with each of the chunk entries on the chunk map, the client data transfer engine can detect if all the chunks of the data file have been received. If not all chunks have been received the transfer may be restarted or an error reported to the initiating user interface application.

If, however, all chunks of the file have been received, the client data transfer engine may close the data transfer by sending a transfer done request with the transfer identifier to the common data transfer interface of the data transfer server. The client data transfer engine can then move the file to the location specified for the file in the request for the file download as received from the user interface application. When the data transfer server receives the transfer done request, the data transfer server can remove the temporary file and any other objects associated with the data transfer at the data transfer server. The client data transfer engine may also respond to the user interface application at the client device that initiated the data transfer indicating the transfer has been successful and the file now resides as the specified location.

Embodiments as disclosed may thus provide a number of advantages in the transfer of data between content management systems and client devices or user interface applications for those content management systems, including for example, maximizing performance, reducing latency, and efficient utilization in network bandwidth through the parallel transfer of files in smaller chunks. These advantages may be achieved at least in part by transferring chunks of a file on multiple concurrent HTTP requests, optimizing use of available network bandwidth, improving reliability of individual transactions by limiting data size, improving error recovery by allowing retransmission of failed chunks and providing the ability to resume failed transactions in the event of a network disturbance.

Moreover, embodiments may utilize HTTP/HTTPS (e.g., including persistent connections) to minimize the impact of connection handshake times, especially on high-latency networks and avoiding the need to open additional firewall ports. Additionally, embodiments may use data compression to reduce data transfer payload (in some cases relying on the native data encryption of the protocol (e.g., HTTPS) for data encryption) and utilizing a content management system's own security checks to validate all data transactions.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

FIGS. 2A-1 to 2A-8 and 2B-1 to 2B-4 are flow diagrams illustrating a data upload using an embodiment of a data transfer system.

FIGS. 3A-1 to 3A-8 and 3B-1 to 3B-2 are flow diagrams illustrating a data download using an embodiment of a data transfer system.

DETAILED DESCRIPTION

Figure 1:
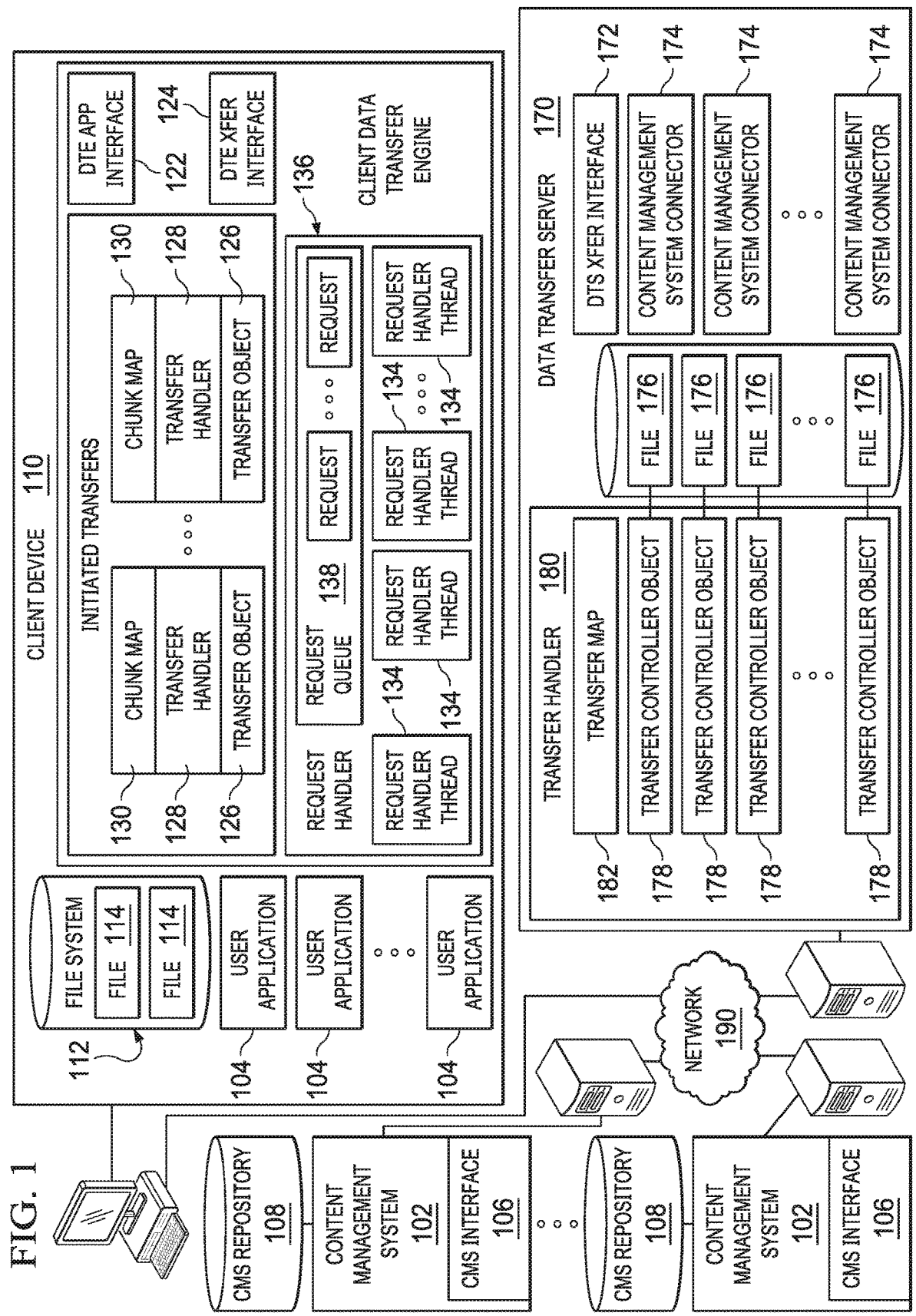
FIG. 1 is a block diagram illustrating one embodiment of an architecture that includes a data transfer system.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing specific embodiments a brief overview of the context of the disclosure may be helpful. As discussed above, the need to transfer data between computing devices over networks grows ever more important while the size of the data it is desired to transfer is increasing. This combination has resulted in the undesirable latency issues in the transfer of this data. Efficient and reliable data transfer is desired in a variety of contexts.

A particular one of these contexts is a managed content environment where, oftentimes, large enterprises or other entities employ content management systems are employed to allow for the management of content by controlling the access, editing, updating, versioning, etc. of content.

Using such content management systems then, users may access managed content to, for example, edit such content. To access such content users typically use a user interface (UI) to interface with a content management server of the content management system. As all content accessed by users of the content management system may need to be transmitted from the content management system to the user's device, the use of content management systems or other types of central repositories (or more even more generally services architectures) may entail the transfer of a large number of files.

These content management environments may thus present some unique difficulties with respect to data transfers on a computer network. Specifically, files of all sizes may be transferred between client devices or applications and content management systems over a network. The transfer of the data of these larger files may be particularly sensitive to the effects of network latency or bandwidth issues, error recovery, or security issues, among others. In particular, users of such content management systems may transfer multiple large files simultaneously, and a content management system may have to deal with not only these large file transfers from a single user, but from all users across the enterprise, substantially simultaneously. As another concern, many of these content management systems employ security measures to authenticate users or impose access controls on those users. Thus, any data transfer solution must integrate, or be compatible with, these security measures.

Additionally, in many instances an enterprise will employ multiple content management systems in the enterprise environment. Thus, to implement any sort of data transfer solution requires that the solution be implemented with respect to each interface (e.g., user interface or application) for use with each content management system and with each content management server, including any security measures employed by each of the content management systems. This solution becomes somewhat untenable given the number of users in a typical enterprise and the number of applications or interfaces that may utilize each content management system.

Moreover, recent trends have involved the deployment of content management servers in cloud based computing platforms while interfaces for these content management systems are increasingly being provided as web based interfaces or plug-ins. Such deployments greatly increase the cost and complexity of implementing data transfer solutions as any data transfer solution employed for using a managed content environment would need to be integrated with each of these interfaces.

Accordingly, what is desired is effective, reliable, quick, and efficient solutions for data transfer that may, for example, reduce the effects of network latency in data transfers and maximize bandwidth usage while improving reliability or error recovery. Specifically, what is desired are efficient, speedy and reliable data transfer solutions for use in a managed content environment.

To that end, among others, a service based data transfer system is disclosed herein. A data transfer system may include a data transfer server providing a common data transfer interface such as a (e.g., web) services interface that may be called by a client device to transfer data files to (e.g., upload), or retrieve data files from (e.g., download) a particular content management system. This common data transfer interface may operate according to an established transfer protocol such as HyperText Transfer Protocol (HTTP) or HTTP Secure (HTTPs)) and may be, for example, be a Representational State Transfer (REST) interface. These client devices or application may be any devices or applications associated with users (either human, machine or software) of a content management system and will be collectively referred to herein as client devices without loss of generality.

Looking then at FIG. 1, a distributed networked computer environment including one embodiment of a data transfer system is disclosed. As discussed, a distributed networked computer environment (e.g., such as an enterprise computing environment) may include one or more content management systems 102 to manage content stored in the repository or file store 108 of the content management system 102. Content management systems 102 allows for the management of such content by controlling the access, editing, updating, versioning, etc. of such content.

To facilitate content management in conjunction with such distributed access, content management systems 102 may be organized around one or more content management servers that provide services associated with the management of such content through a native interface 106 accessible over a computer network 190 such as the Internet, an intranet, a Local or Wide Area Network (LAN or WAN), a wireline, wireless or cellular network, or another type of network. Content management systems 102 like these may be deployed in the cloud or otherwise distributed. Using such content management systems 102 then, users may access managed content in the repository 108 to, for example, edit such content.

To access such content, users use a user interface (UI) or application 104 that interacts with the native interface 106 (e.g., a web services or other type of interface such as a REST interface or other API) of content management system 102. For example, based on a user interaction the user application 104 can use the native interface 106 to reserve (or "check out") content and download or access it locally on their client device 110. The user can then edit the document, save the changed version to the content management system 102 and unreserve the content. In some cases, as content within a distributed networked environment may be distributed between multiple content management systems 102 or there may be multiple user applications 104 for a single content management system 102, multiple user applications 104 may reside on client device 110. These user applications 104 may, for example be standalone applications installed or accessible on the client device 110 (e.g., desktop applications for example) or may be web based applications such that they are accessible over a network or are executing a browser at the client device 110.

As may be observed, distributed networked architectures such as the one described may entail a large number of file transfers, where the files being transferred may themselves be quite large. What is desired then is effective, reliable, quick, and efficient solutions for data transfer that may, for example, reduce the effects of network latency in data transfers and maximize bandwidth usage while improving reliability or error recovery. Specifically, what is desired are efficient, speedy and reliable data transfer solutions for use in such a managed content environment.

Accordingly, an embodiment of a data transfer system may be employed, wherein the data transfer system may include a client data transfer engine 120 deployed on the client device 110 and a remote data transfer server 170 adapted to transfer files between the client device 110 and a content management system 102 using the native interface 106 of the content management system 102.

In particular, the remote data transfer server 170 is associated with, and adapted to interact with, one or more content management systems 102. For example, the data transfer server 170 may be deployed in a cloud computing environment, a data center (e.g., associated with a content management system 102) or otherwise provided as a network accessible service. There may be multiple instances of the remote data transfer server 170, each instance of the remote data transfer server 170 associated with a corresponding content management system 102 and adapted to transfer files between client devices 110 and the corresponding content server 102. An instance of the data transfer server 170 may also be adapted to transfer files between a client device 110 and multiple content management systems 102.

Embodiments of the data transfer server 170 may thus include a content management system connector 174 for each associated content management system 102, where the content management system connector 174 for a content management system 102 is adapted to receive a request for functionality to be performed for the associated content management system 102 from processes or components of the data transfer server 170 (e.g., storage or retrieval of a file, determining data or metadata associated with a file, authentication, checking of status, etc.) along with the associated data (e.g., file data or metadata, including a file location, authentication data, etc.). The content management system connector 174 can accomplish the requested functionality using the native interface 106 of the associated content management system 102. Each content management system connector 174 may be part of a pluggable architecture and provide a substantially similar interface to the internal processes or components of the processes or components of the data transfer server 170 to allow requests to each content management system connector 174 to be formatted in a substantially similar or identical manner, regardless of the content management system 102 associated with the content management system connector 174.

Similarly, embodiments of the data transfer server 170 provide a data transfer server transfer interface 172, that may be a common data transfer interface such as a (e.g., web) services interface, where the data transfer server transfer interface 172 may be called by client device 110 (e.g. by client data transfer engine 120 through the client data transfer engine transfer interface 124) to transfer data files to (e.g., upload), or retrieve data files from (e.g., download) a particular content management system 102. Embodiments of a data transfer server 170 may be implemented, for example, to include a Java/Tomcat server component that may handle file requests or transactions. The client devices 110 or applications may be any devices or applications associated with users (either human, machine or software) of a content management system and will be collectively referred to herein as client devices without loss of generality. Common data transfer interface 172 may operate according to an established transfer protocol such as HyperText Transfer Protocol (HTTP) or HTTP Secure (HTTPS)) and may be, for example, be a Representational State Transfer (REST) interface. In one embodiment, when a (e.g., single or single instance of a) data transfer server 172 may be used to transfer data between client device 110 and multiple content management systems 102 (e.g., and thus has multiple content management systems connector) the data transfer server transfer interface 172 may include a distinct Uniform Resource Identifier (URI) or other interface for each of the multiple content management system 102.

Accordingly, the data transfer server transfer interface 172 may be called by client device 110 to transfer data files between the client device and a content management system 102. Specifically, in one embodiment, client data transfer engine 120 may be incorporated into a particular user interface application 104 for a content management system 102 (e.g., be a module, function, plug-in etc. of a user interface application). Embodiments of a client data transfer engine 120 may also be a standalone application or plug-in on a client device 110. For example, in cases where the user application 104 for a content management system 102 is a web based application accessed through a browser, the client data transfer engine 120 may, for example, be a plug-in of the web browser.

In these types of embodiments, the client data transfer engine 120 may offer a data transfer engine application interface 122 such as an Application Programming Interface (API), a Representational State Transfer (REST) interface on another type of interface that may be utilized by a user interface application 104. This data transfer engine application interface 122 may be specific to each content management system 102 or user application 104 utilizing the data transfer system and may be configured with one or more addresses or ports of the data transfer server 170 such that requests may be directed to the correct data transfer server 170 or port thereof. By using specific interfaces for each content management system 102 or user application 104, the calling application 104 may be allowed to specify file transfer operations in terms specific to the particular format of the file repository 108 and object identification requirements for the content management system 102 involved in the data transfer.

It should be noted here that though embodiments are being described with respect to a client device 110 employing user applications 104, this embodiment is given by way of example only without loss of generality and that client devices 110 may be utilized for a wide variety of other uses, including as servers or nodes for a distributed system in which files or other types of data is transferred, including distributed content management system. It will also be noted that while client devices and data transfer servers have been described herein separately, in other embodiments a single device, machine, application or executing process or instance may include both a client data transfer engine and a data transfer server.

By implementing the client data transfer engine 120 as a standalone application or plug-in on a client device 110, where the client data transfer engine 112 provides a client data transfer engine application interface 122, multiple different user interfaces 104 associated with multiple different content management systems 102 may utilize the same data transfer system through the client data transfer engine application interface 122 provided by the client data transfer engine 120. According to examples of such a data transfer engine application interface 122, the interface will be exposed at a fixed local endpoint, which will be encoded in the application (e.g., http://localhost:9999/qds/rest). The user application 104 may retry or cancel failed transfer requests. All request and response data (e.g., POSTs to the interface) may be in the request/response body and encoded in JavaScript Object Notation (JSON).

As discussed, as a user is interacting with the user application 104 on the client device 110, the user may have authenticated with content management system 102 using user application 104 (e.g., through the content management system interface 106, thus any authentication or security parameters may be present on all local requests to the client data transfer engine application interface 122 that are requesting the transfer of data to a content management system 102. These may include an 'Authorization' header containing a bearer token and 'client' header containing the user's client id or an 'accesstoken' cookie. In one embodiment, the user application 104 may configure the client data transfer engine 120 with a proper address for a corresponding data transfer server 170 associated with a content management system 102 for that user application server such that requests are addressed to the proper data transfer server 160 server for the corresponding content management system 102. One example of a client data transfer engine application interface 122 is given in Appendix A.

The client data transfer engine 120 may also include client data transfer engine transfer interface 124 for communicating with data transfer server transfer interface 172 as discussed. In one embodiment, this common data transfer interface 172 may provide an interface (e.g., a URI) for the download of a file from, or the upload of a file to, a content management system 102. For example, for a file upload there may be an interface for initiating an upload (e.g., /qds/xfer/v1/write/start), an interface for sending chunks of data (e.g., /qds/xfer/v1/write/<transfer id>) and an interface for committing the file to the content management system 102 and closing the file transfer (e.g., /qds/xfer/v1/write/<transfer id>/done). Similarly, for a file download there may be an interface for initiating a download (e.g., /qds/xfer/v1/read/start), an interface for obtaining or retrieving a chunk of data (e.g., /qds/xfer/v1/read/<transfer id>) and an interface for closing the file transfer (e.g., /qds/xfer/v1/read/<transfer id>/done).

Using the data transfer interface 172 then, the client data transfer engine 120 may transfer files to or from different types of content management systems 102 using the common data transfer interface of the data transfer server. To illustrate embodiments in more detail, the client data transfer engine 120 may receive a request to upload to, or download a file from, a content management system 102 at the data transfer application interface 122. This request may be from a user application 104 at the client device 110. Such a request may be generated, for example, when a user attempts to access a file managed by content management system 102 or store a file to content management system 102.

In some instances, the user application 104 may determine the size of the file to be transferred (e.g., by touching the file when it is stored on the local file system 112 of the client device 110 or by communicating directly with the content management system to determine the size of the file), and will initiate the file transfer using the client data transfer engine 120 only when the size of the file is greater than a threshold size (e.g., 1 MB, 10 MB, 20 MB, 100 MB, twice a chunk size, three time a chunk size, etc.). If the size of the file is below the threshold, the user application 104 may transfer the file directly between the user application 104 and the content management system 102. In this manner, transfers using embodiments of a data transfer system may be confined to only files over a certain size, speeding the transfer of these files.

When the user application 104 does initiate the data transfer, the user application 104 may call the data transfer engine application interface 122 of the client data transfer engine 120 to request a type of transfer and pass contextual information associated with the transfer to the client data transfer engine 120 to accomplish the transfer of the file. For example, the request may include the location of the file 114 on the client device (e.g., a location in file system 112) where the file to be uploaded is located or where the file to be downloaded is to be placed. The request may also include the location associated with the content management system 102 for the file where the file to be uploaded is to be located at the content management system 102 or where the file to be downloaded is located at the content management system 102. Additionally, the context of the request to the data transfer application interface 122 may include authentication data such as user credentials or tokens obtained from, or used with, content management system 102 for authentication. This authentication data may, for example, have been obtained by the user application 104 through previous interaction with the content management system 102.

When such a request is received though data transfer application interface 122, the client data transfer engine 120 may initiate the data transfer of the data file to a content management system 102 using the common data transfer interface 172 of the data transfer server (e.g., may send a request to the data transfer server through the interface), specifying whether the transfer is for an upload or a download of data and providing the contextual data for the data transfer, including a location associated with the file to be transferred in the content management system, a chunk size to use, or any needed user authentication information.

It may now be useful to address an upload of a file from the client device 110 to a content management system 102 separately from a download of a file from the content management server 102 to the client device 110. Addressing first an upload of such a file, in the case of an upload, the client data transfer engine 120 may initiate the data transfer of the data file using the common data transfer interface 172 by issuing a POST to the address of the data transfer server for the URI "/qds/xfer/v1/write/start". This POST may include (e.g., in a JSON body) an identifier a file to be uploaded and its target location at the content management system 102 and, in some instances, a chunk size to use. In certain instances, the request may also indicate (directly or indirectly) a particular content management system 102 to which the file is to be uploaded.

In some cases, any authentication information required by the content management system 102 may be included in this (or any subsequent) requests. In such cases, the user application 104 may include a session identifier or authorization header in its initial request through data transfer engine application interface 122 as if it were calling the interface of the content management system 102. These identifiers may be passed to the content management server 102 for validation. For filesystem based content management system 102, the session key may be validated against the content managing server 102 at the start of each transfer, and then may be present on all subsequent requests for file transfer. For content management systems 102 accessed via REST, an authorization header may be stored at the data transfer server 170 and presented on each request to the content management system interface 106 from the data transfer server 170 so that the requests appear authorized by the user.

When a request to initiate the data transfer of a file is received at the data transfer interface 172 of the data transfer server 170, the data transfer server 170 may generate a transfer identifier to be used for the data transfer (e.g., to route requests for the data transfer) and return the transfer identifier to the client data transfer engine 120. Additionally, a transfer handler 180 of the data transfer server 170 instantiates or otherwise creates a transfer controller object 178 for use with the data transfer, and an associated file 176 for storage of data to be received during the transfer. In some embodiments, the transfer controller object 178 may create the associated file 176 as part of its initialization process. The transfer controller object 178 may be adapted to service requests associated with the transfer identifier during the transfer. The transfer handler 180 can then enter an association between the transfer identifier generated for the transfer and the created transfer controller object 178 in a transfer map 182 for maintaining such associations. In this manner, incoming requests including the transfer identifier may be routed to the associated transfer controller object 178.

When the client data transfer engine 120 receives the transfer identifier from the data transfer server 172, the client data transfer engine 120 may create a transfer object 126 for the initiated transfer. This transfer object 126 may include a transfer handler 128 for handling the transfer of data for the initiated transfer. The transfer object 126 is thus configured with, or can obtain, the transfer identifier returned by the data transfer server 172, the location of the file 114 in the filesystem 112 of the client device 110 and the size of the file 114.

Based on the file 114 to be transferred, the transfer handler 128 may create a chunk map 130. Specifically, in one embodiment, the file 114 may be transferred as a set of chunks of a configured constant size. This chunk size may be a size that can be reliably transferred over network 190 under almost any operating circumstances of network 190, but is still small enough to allow concurrent transmission with a significant proportion of data files as is encountered in typical operation. The chunk size may be, for example, 2 MB, 4 MB or the like.

Chunk map 130 may therefore include the size of the file, how many chunks there will be, whether those chunks have been transferred or whether those transfers are completed (the status of ongoing transfers, etc.). The status of each chunk of file can include whether the chunk has been sent or whether a response has been received and can be used to track the transfer. In particular, in one embodiment, the chunk map may comprise an ordered set of entries for each chunk of file that comprise a data file including an identifier for each chunk of the data file being transferred, an offset (e.g., in bytes) of that chunk from the beginning of the file (e.g., byte 0) and a status of that chunk. The status may be a binary status indicated transferred or not transferred, or may have three states: sent, unsent and completed. Other states are possible. In the case of an upload of a file 114, the transfer handler 128 may therefore have access to the file 114 or the characteristics of the data file 114 at the client device 110. The transfer handler 128 can thus establish a chunk map 130 for the data transfer that references each chunk of the data file 114 by referencing the size of the data file 114 to be transferred and determining the set of chunks and corresponding offsets that comprise the data file.

The transfer handler 128 can thus send chunks of the file 114 to the data transfer server 170. Until there are no more chunks to send (e.g., a status of each chunk reflects that it has been sent or completed), the transfer handler 128 may asynchronously or continuously reference the chunk map 130, determine a next chunk to send by determining a first (e.g., lowest or highest offset) chunk of the data file 114 that has not been transferred (e.g., has not been sent or completed) using the status of the chunks as maintained in the chunk map 130, obtain the data of that chunk from the data file 114 starting at the offset specified in the chunk entry for that chunk in the chunk map, request the transfer of that chunk using the set of request threads (also referred to as request handler threads) 134 and update the status of that chunk to reflect it has been sent. It will be noted that though the chunk size may be constant the last chunk of a file may be smaller than the chunk size.

The chunks of a file 114 can be sent using a set (also referred to as a pool) of request threads 134 managed by request handler 136. Threads 134 may each be adapted to send a request to the data transfer server 170 associated with a chunk of the file using the interface (e.g., the HTTP or HTTPS interface) provided by the data transfer server 170 and may be adapted for handling requests for data transfers conducted by the client data transfer engine 120 at the client device 110. In certain embodiments, there may be a pool of requests threads 134 (e.g., 8, 16 or 32 threads) where each of the request threads 134 owns, or is associated with, a corresponding HTTP request channel. In this way, multiple chunks of the data file (or multiple data files) may be transferred concurrently over HTTP.

Thus, when transfer handler 128 wishes to transfer an upload chunk of a file 114 it may send a request identifying a type of the request (e.g., upload) with the data of the chunk and the transfer identifier to the request handler 136. The request handler 136 can place these received requests on the request queue 138. When a request thread is free (e.g., as determined by request handler 136), the request handler 136 may provide the next request on the request queue 138 to the free request thread 134.

The request thread 134 may then send the chunk to the data transfer server 170 by sending a request (e.g., an HTTP request) to the common data transfer interface 172 of the data transfer server 170 (e.g., on the HTTP/HTTPS channel associated that request thread 134). The request thread 134 can then await any response from the data transfer server 170.

The request to the common data transfer interface 172 from the request thread 134 may indicate an upload of a chunk and include the transfer identifier assigned by the data transfer server, the data (e.g., the binary data) of the chunk, the length of the data being transferred and the (e.g., starting byte) offset of that chunk within the data file being transferred. In one embodiment, the request thread 134 issues a POST to the address of the data transfer server for the URI "/qds/xfer/v1/write/<transfer id>". This POST may include (e.g., in a JSON body) the starting byte offset of the chunk, a logical data length or a compressed data length passed as query arguments. The binary data of the chunk may be posted as data type application/octet-stream.

When the data transfer server 170 receives such an upload request at the common data transfer interface 172, the transfer handler 180 may utilize the transfer identifier included in the request and the transfer map 182 to determine the transfer controller object 178 associated with the transfer identifier of the request and route the request to that transfer controller object 178. The transfer controller object 178 associated with the transfer can then write the data of the chunk received in the request into the file 176 associated with that transfer controller object 178 at the offset specified in the request.

The data transfer server 170 can then send a response to the received request back to the client data transfer engine 120 indicating that the chunk has been received (or, if there was a problem, that the transfer of the chunk has failed). This response from the data transfer server 170 may be received at the request thread 134 that issued the associated original request, and the response provided from the request thread 134 to the associated transfer object 126 or transfer handler 128 associated with the data transfer. When transfer handler 128 receives the response, the transfer handler 128 may access the chunk map 130 associated with the data transfer and update (if needed) the entry in the chunk map 130 for the chunk associated with the received response indicating it has been transferred (or update the entry to indicate the chunk is untransmitted). In this manner, if a chunk failure notification is received, or a chunk request times out, the chunk will be sent again (e.g., as it is again marked as untransmitted).

Using the chunk map 130 for the data transfer then, and the status associated with each of the chunk entries in the chunk map 130, the transfer handler 128 can detect that all the chunks of the data file 114 have been transferred to the data transfer server 170. When this determination is made, the transfer handler 128 may commit the file 114 to the content management system 102 and close the data transfer by sending a transfer done request with the transfer identifier to the common data transfer interface 172 of the data transfer server 170. In one embodiment, the transfer handler 128 issues a POST to the address of the data transfer server for the URI "/qds/xfer/v1/write/<transfer id>/done".

When the data transfer server 170 receives such an upload commit request at the common data transfer interface 172, the transfer handler 180 may utilize the transfer identifier included in the request and the transfer map 182 to determine the transfer controller object 178 associated with the transfer identifier of the request and route the request to that transfer controller object 178. The transfer controller object 178 associated with the transfer can obtain the location in the content management system 102 for the file being transferred and obtain the data for the complete file 176. The transfer controller object 178 sends a request to the native interface 106 of the content management system 102 requesting the storage of the data of file 176 at the associated location specified for the file at content management system 102. Specifically, the transfer controller object 178 issue the request to store the file 176 at the specified location to the native interface 106 of the content management system 102 through the content management system connector 174 for that particular content management system 102. When the file is stored at the location in the content management system 102, a response may be received from the content management system 102 confirming storage of the file.

The data transfer server 170 (e.g., once it receives a response indicating the file has been stored at the location on the content management system through the associated connector) can free the transfer controller object 178 associated with the transfer and remove the association between the transfer identifier and the transfer controller object from the transfer map 182. The data transfer server 170 can then respond to the commit request from the client data transfer engine 120. In some instances, the client data transfer engine 120 may instead poll the data transfer server 170 using the transfer identifier to determine if the transfer of the file to the content management system 102 has been completed.

Once the data transfer is completed the data transfer server can remove the temporary file and any other objects associated with the data transfer at the data transfer server and the client data transfer engine may respond to the user interface application at the client device that initiated the data transfer indicating the transfer has been successful.

This response from the data transfer server 170 may be received at the request thread 134 that issued the associated commit request, and the response provided from the request thread 134 to the associated transfer object 126 or transfer handler 128 associated with the data transfer and, in turn, to the client data transfer engine 120. When client data transfer engine 120 receives the response, the client data transfer engine 120 may free the transfer object 126 associated with the data transfer and respond to the user application 104 that originally issued the data transfer request through the data transfer engine application interface 122, confirming storage of the file in the content management system 102.

Turning now to a download of a file from a content management system 102, the client data transfer engine 120 may initiate the data transfer of the data file using the common data transfer interface 172 by issuing a POST to the address of the data transfer server for the URI "/qds/xfer/v1/read/start". This POST may include (e.g., in a JSON body) an identifier of a file to be downloaded and its location at the content management system 102 (e.g., which may be a path or other tokens), any authentication information needed and, in some instances, a chunk size to use. In certain instances, the request may also indicate (directly or indirectly) a particular content management system 102 to which the file is to be uploaded.

When the request to initiate the data transfer of the file from the content management system 102 is received at the data transfer interface 172 of the data transfer server 170, the data transfer server 170 may generate a transfer identifier to be used for the data transfer (e.g., to route requests for the data transfer). Additionally, a transfer handler 180 of the data transfer server 170 instantiates or otherwise creates a transfer controller object 178 for use with the data transfer, and an associated file 176 for storage of data to be received during the transfer. The transfer handler 180 can then enter an association between the transfer identifier generated for the transfer and the created transfer controller object 178 in a transfer map 182 for maintaining such associations. In this manner, incoming requests including the transfer identifier may be routed to the associated transfer controller object 178.

The transfer controller object 178 associated with the transfer can utilize the location of the file in the content management system 102 for the file being transferred as received in the request to send a request to the native interface 106 of the content management system 102 requesting the download of the file at that location. Specifically, the transfer controller object 178 issues the request to download the file at the specified location to the native interface 106 of the content management system 102 through the content management system connector 174 for that particular content management system 102.

The content management system 102 can the access the file at the specified location and respond to the data transfer server 170 with the file. This response may, for example, be a stream of file data associated with the file from the content management system 102 to the data transfer server 170 (e.g., through the content management system connector 174 to the transfer controller object 178). When the transfer controller object 178 receives the file data from the content management system 102 it may write the data into the associated file 176. The data transfer server 170 can also return the generated transfer identifier to the client data transfer engine 120.

When the client data transfer engine 120 receives the transfer identifier from the data transfer server 172, the client data transfer engine 120 may create a transfer object 126 for the initiated transfer. This transfer object 126 may include a transfer handler 128 for handling the transfer of data for the initiated transfer. The transfer object 126 is thus configured with, or can obtain, the transfer identifier returned by the data transfer server 172 and the location in the filesystem 112 of the client device 110 where the file is to be downloaded. The transfer handler may create a file 114 in the filesystem where the downloaded file is to be stored. This file 114 may reside at the location in filesystem 112 specified for the downloaded file in the initial request received from the user application 104 or may be at another location that may later be moved to the specified location.

The transfer handler 128 may create a chunk map 130 for the transfer. Here, the transfer handler 128 may not be aware of the size of the data file being transferred (e.g., because the data file is resident at the content management server 102). Accordingly, the chunk map may initially be established without any chunk entries and may be dynamically updated with chunk entries as the existence of chunks can be determined.

The transfer handler 128 can then request chunks of the file from the data transfer server 170. Specifically, until there are no more chunks to receive (e.g., an EOF indicator is received from the data transfer server 170), the transfer handler 128 may asynchronously or continuously request the transfer of a chunk using the set of request threads 134 managed by request handler 136.

Thus, when transfer handler 128 wishes to request a chunk of the file it may send a request identifying a type of the request (e.g., download) and the transfer identifier to the request handler 136. The request handler 136 can place these received requests on the request queue 138. When a request thread 134 is free (e.g., as determined by request handler 136), the request handler 136 may provide the next request on the request queue 138 to the free request thread 134.

The request thread 134 may then send a request for a chunk to the data transfer server 170 by sending a request (e.g., an HTTP request) to the common data transfer interface 172 of the data transfer server 170 (e.g., on the HTTP/HTTPS channel associated that request thread 134). The request thread 134 can then await any response from the data transfer server 170. The request to the data transfer interface 172 from the request thread 134 may indicate a request for a chunk and include the transfer identifier assigned by the data transfer server and a chunk size to utilize. In one embodiment, the request thread 134 issues a POST to the address of the data transfer server for the URI "/qds/xfer/v1/read/<transfer id>". This POST may include a (e.g., JSON) body specifying the chunk size to utilize.

When the data transfer server 170 receives a download request at the common data transfer interface 172, the transfer handler 180 may utilize the transfer identifier included in the request and the transfer map 182 to determine the transfer controller object 178 associated with the transfer identifier of the request and route the request for a chunk to that transfer controller object 178. The transfer controller object 178 associated with the transfer can utilize the transfer identifier included in the request to locate the file 176 at the data transfer server 170 associated with the data transfer and a current location pointer for the file 176 associated with the data transfer maintained by the transfer controller object 178. The location pointer may be used to determine what data of the file 176 has been previously transferred in a response to the client data transfer engine 120.

If the location pointer indicates that the end of the file 176 has been reached (e.g., all data of the file has been transferred), the transfer controller object 178 can send a response with an end of file (EOF) marker or indicator. Otherwise, using the current location pointer the transfer controller object 178 can obtain a next chunk of the configured chunk size (or less if it is the last chunk) from the file 176 associated with the transfer beginning at the current location, and update the current location pointer.

The transfer controller object 178 can then send a response to the received download request back to the client data transfer engine 120 with the chunk and the length of that chunk or the offset (e.g., beginning byte) of that chunk within the data file being transferred. In one embodiment, if the chunk being transferred is the last chunk of the file this response may also include an EOF indicator. The response may be a multipart/form-data response consisting of two parts. A JSON part includes the chunk size, offset and status, and a binary part contains the chunk data itself. This scheme allows the server to transmit data sequentially from the input stream into each chunk response, which can then be received in any order by the client.

This response from the data transfer server 170 may be received at the request thread 134 that issued the associated original request, and the response provided from the request thread 134 to the associated transfer object 126 or transfer handler 128 associated with the data transfer. When transfer handler 128 receives the response, the transfer handler 128 can determine if the response includes EOF indicator or includes data for a chunk. If the response includes data for a chunk, the transfer handler 128 may write the chunk data into the file 114 associated with the transfer at the offset specified in the response. The transfer handler 128 may also update the chunk map 130 associated with the data transfer based on the response and the offset included therein. This update may entail the determination and creation of chunk entries for sets of chunks that may exist or have been received, the updates of associated offsets of the creation or update of the status associated with one or more chunk entries indicating a chunk has been received or not.

If the response includes an EOF indicator the issuing of requests for the data transfer may be stopped. The completion of outstanding requests (or a certain amount of time) may be waited and the chunk map 130 checked to determine if any of the chunks for the file being transferred have not been received based on the status of the chunk entries in the chunk map. Using the chunk map 130 for the data transfer then, and the status associated with each of the chunk entries on the chunk map, the transfer handler 128 can determine if all the chunks of the data file have been received. If not all chunks have been received, the transfer handler 128 may restart the transfer or report an error to the initiating user application 104.

If, however, all chunks of the file have been received, the transfer handler 128 may close the data transfer by sending a transfer done request with the transfer identifier to the data transfer interface 172 of the data transfer server 170. In one embodiment, the transfer handler 128 issues a POST to the address of the data transfer server for the URI "/qds/xfer/v1/read/<transfer id>/done".

When the data transfer server 170 receives such a download close request at the common data transfer interface 172, the transfer handler 180 may utilize the transfer identifier included in the request and the transfer map 182 to determine the transfer controller object 178 associated with the transfer identifier of the request, free the transfer controller object 178 associated with the transfer, remove the association between the transfer identifier and the transfer controller object 178 from the transfer map 182 and remove the associated file 176. The data transfer server 170 may respond to the close request or, in certain embodiments, such a close request may entail no response.

The response from the data transfer server 170 may be received at the request thread 134 that issued the associated commit request, and the response provided from the request thread 134 to the associated transfer object 126 or transfer handler 128 associated with the data transfer and, in turn, to the client data transfer engine 120. When client data transfer engine 120 receives the response, the client data transfer engine 120 may move the file 114 to the location specified for the file in the request for the file as received from the user application 104, free the transfer object 126 associated with the data transfer and respond to the user application 104 that originally issued the data transfer request through the data transfer engine application interface 122, confirming download of the file 114 from the content management system 102.

Figures 2, 2B, 3, 4:
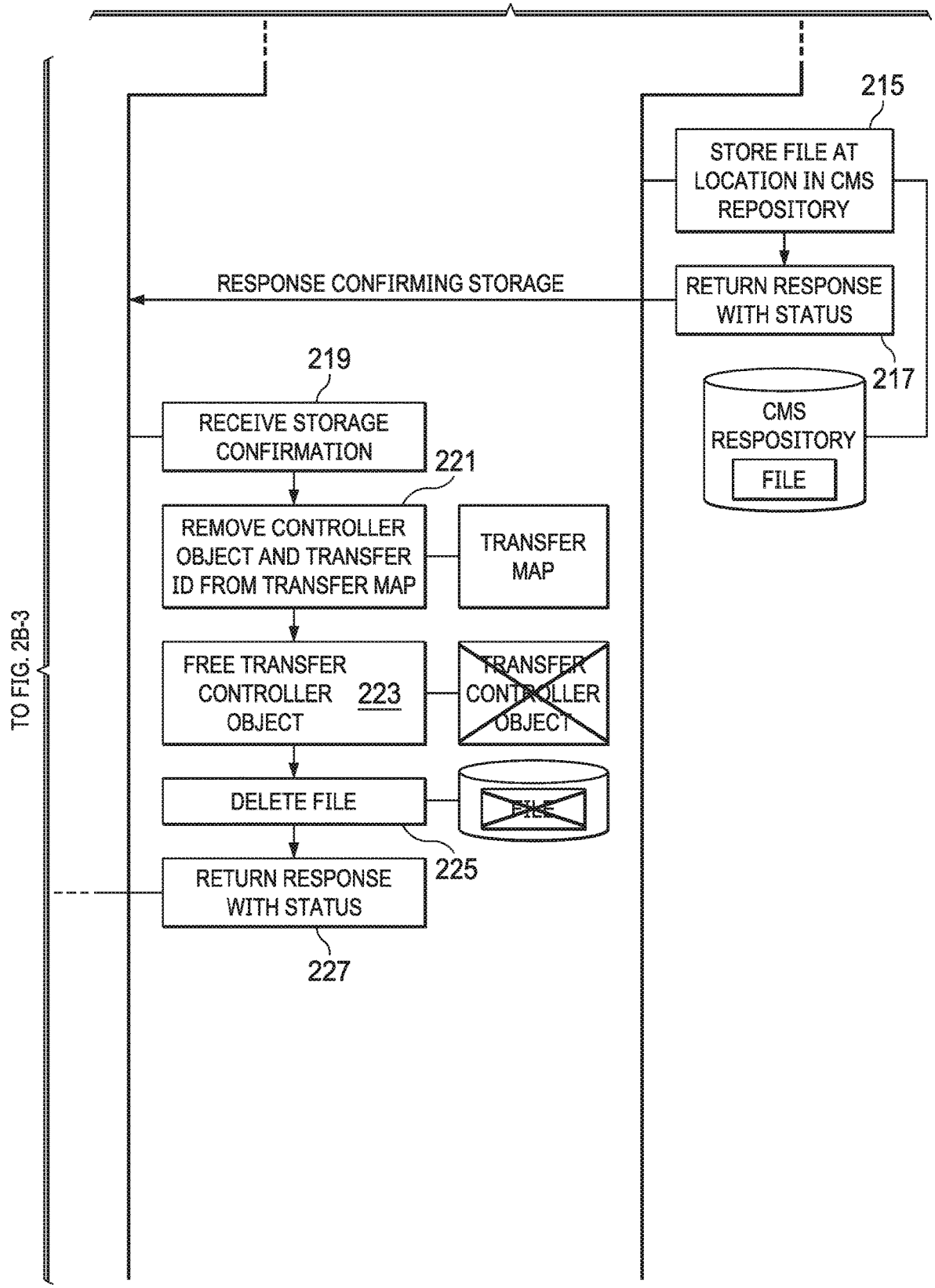

It may now be useful to an understanding of embodiments to individually depict the flow of data transfer systems in an upload and a download operation. Referring to FIGS. 2A and 2B, then, flow diagrams illustrating a data upload using an embodiment of a data transfer system are depicted. Looking first at FIG. 2A, as discussed, as a user is interacting with the user application 200 on a client device a user may attempt to store or otherwise upload a file to a content management system. The user application 200 may call the data transfer engine application interface of the client data transfer engine 202 to request an upload and pass contextual information associated with the upload to the client data transfer engine 202 to accomplish the transfer of the file (STEP 206). For example, the request may include the location of the file on the client device where the file to be uploaded is located. The request may also include the location associated with the content management system for the file where the file to be uploaded is to be located at the content management system. Additionally, the context of the request to the data transfer application interface may include authentication data such as user credentials or tokens obtained from, or used with, content management system for authentication.

When such a request is received, the client data transfer engine 202 may locate the file to be transferred in the local filesystem at the client device (STEP 208) and initiate the data transfer of the data file to the content management system using the common data transfer interface of the data transfer server by sending a request to the data transfer server 204 through the interface (STEP 210). This request may specify the transfer is for an upload and provide the contextual data for the data transfer, including a location associated with the file to be transferred in the content management system, a chunk size to use, or any needed user authentication information.

When a request to initiate the upload of a file is received at the data transfer server 204 (STEP 214), the data transfer server 204 may generate a transfer identifier to be used for the data transfer (STEP 216). Additionally, a transfer controller object for use with the data transfer and an associated file for storage of data to be received during the transfer may be created (STEPS 218, 220). The association between the transfer identifier generated for the transfer and the created transfer controller object may be entered in a transfer map for maintaining such associations (STEP 222). The transfer identifier can then be returned to the client data transfer engine 202 (STEP 224).

When the client data transfer engine 202 receives the transfer identifier from the data transfer server 204 (STEP 226), the client data transfer engine 202 may create a transfer object for the initiated transfer. (STEP 228) This transfer object may include a transfer handler for handling the transfer of data for the initiated transfer. The transfer object is thus configured with, or can obtain, the transfer identifier returned by the data transfer server 204, the location of the file in the filesystem of the client device and the size of the file.

Based on the file to be transferred, the transfer handler may create a chunk map (STEP 230). The chunk map may therefore include the size of the file, how many chunks there will be, whether those chunks have been transferred or whether those transfers are completed (the status of ongoing transfers, etc.). The status of each chunk of file can include whether the chunk has been sent or whether a response has been received and can be used to track the transfer.

The transfer handler can thus send chunks of the file to the data transfer server. Until there are no more chunks to send (e.g., a status of each chunk reflects that it has been sent or completed), the transfer handler may asynchronously or continuously reference the chunk map 130 to determine a next chunk to send by determining a first (e.g., lowest or highest offset) chunk of the data file that has not been transferred (e.g., has not been sent or completed) using the status of the chunks as maintained in the chunk map (STEP 232). The transfer handler can obtain the data of that chunk from the data file starting at the offset specified in the chunk entry for that chunk in the chunk map (STEP 234), request the transfer of that chunk (STEP 236) and update the status of that chunk to reflect it has been sent (STEP 238). If there are no more chunks that have not been transferred (N branch of STEP 240) the request process may idle (STEP 242) while if there are more chunks that have not been transferred (Y branch of STEP 240) the process may determine the next chunk to send (STEP 232).

The requests from the transfer handler to upload a chunk of a file may be sent to the request handler. The request handler places these received requests on the request queue (STEP 244). The request handler can then wait for a request thread to be free (STEP 246). When a request thread is free, the request handler may provide the next request on the request queue to the free request thread (STEP 248). If there are no more requests on the queue (N branch of STEP 250) the request process may idle (STEP 252) while if there are more request that have not been sent (Y branch of STEP 250) the process may determine the wait for the next free request thread (STEP 246).

The request thread may then send the chunk to the data transfer server (STEP 254) by sending a request (e.g., an HTTP request) to the common data transfer interface of the data transfer server 204. The request thread can then await any response from the data transfer server 204 or a timeout of the request (STEPS 256, 258).

When the data transfer server 204 receives such an upload request at the common data transfer interface (STEP 260), the transfer identifier included in the request and the transfer map can be used to determine the transfer controller object associated with the transfer identifier of the request and route the request to that transfer controller object (STEPs 262, 264). The transfer controller object associated with the transfer can then lock the file (STEP 266) and write the data of the chunk received in the request into the file associated with that transfer controller object at the offset specified in the request (STEP 268).

The data transfer server 204 can then send a response to the received request back to the client data transfer engine 202 indicating that the chunk has been received (or, if there was a problem, that the transfer of the chunk has failed) (STEP 270). This response from the data transfer server 204 may be received at the request thread that issued the associated original request (STEP 256), and the response provided from the request thread to the associated transfer handler associated with the data transfer (STEP 274). When transfer handler receives the response (STEP 276), the transfer handler determine the chunk associated with the response (STEP 278) and may access the chunk map associated with the data transfer and update (if needed) the entry in the chunk map for the chunk associated with the received response indicating it has been transferred (STEP 280). In this manner, if a chunk failure notification is received, or a chunk request times out, the chunk will be sent again (e.g., as it is again marked as untransmitted).

Using the chunk map for the data transfer then, and the status associated with each of the chunk entries in the chunk map, the transfer handler can detect if all the chunks of the data file have been transferred to the data transfer server 204 (STEP 282). When this determination is made (Y branch of STEP 282), the transfer handler may commit the file to the content management system (and close the data transfer (STEP 284).

Moving to FIG. 2B, the transfer handler may commit the file to the content management system (and close the data transfer by sending a transfer done request with the transfer identifier to the common data transfer interface of the data transfer server 204 (STEP 203).

When the data transfer server 204 receives such an upload commit request at the common data transfer interface (STEP 205), the transfer identifier included in the request and the transfer map can be used to determine the transfer controller object (STEP 207). The location in the content management system for the file being transferred can be determined (STEP 209) and the complete file obtained (STEP 211). A request can then be sent to the native interface of the content management system 201 requesting the storage of the data of file at the associated location specified for the file at content management system (STEP 213). The content management system 201 can then store the at the location in the content management system 201 (STEP 215) and return a response confirming the storage of the file (STEP 217). When the storage confirmation response is received from the content management system (STEP 219) the data transfer server 204 can free the transfer controller object associated with the transfer, remove the association between the transfer identifier and the transfer controller object from the transfer map and delete the file created for the transfer (STEPS 221, 223, 225). The data transfer server 204 can then respond to the commit request from the client data transfer engine 202 (STEP 227).

The response from the data transfer server 204 may be received at the request thread that issued the associated commit request, and the response provided from the request thread to the associated transfer handler associated with the data transfer and, in turn, to the client data transfer engine 202. When client data transfer engine 202 receives the response (STEP 229), the client data transfer engine 202 may free the transfer object associated with the data transfer (STEP 231) and respond to the user application 200 that originally issued the data.

Figures 1, 3B:
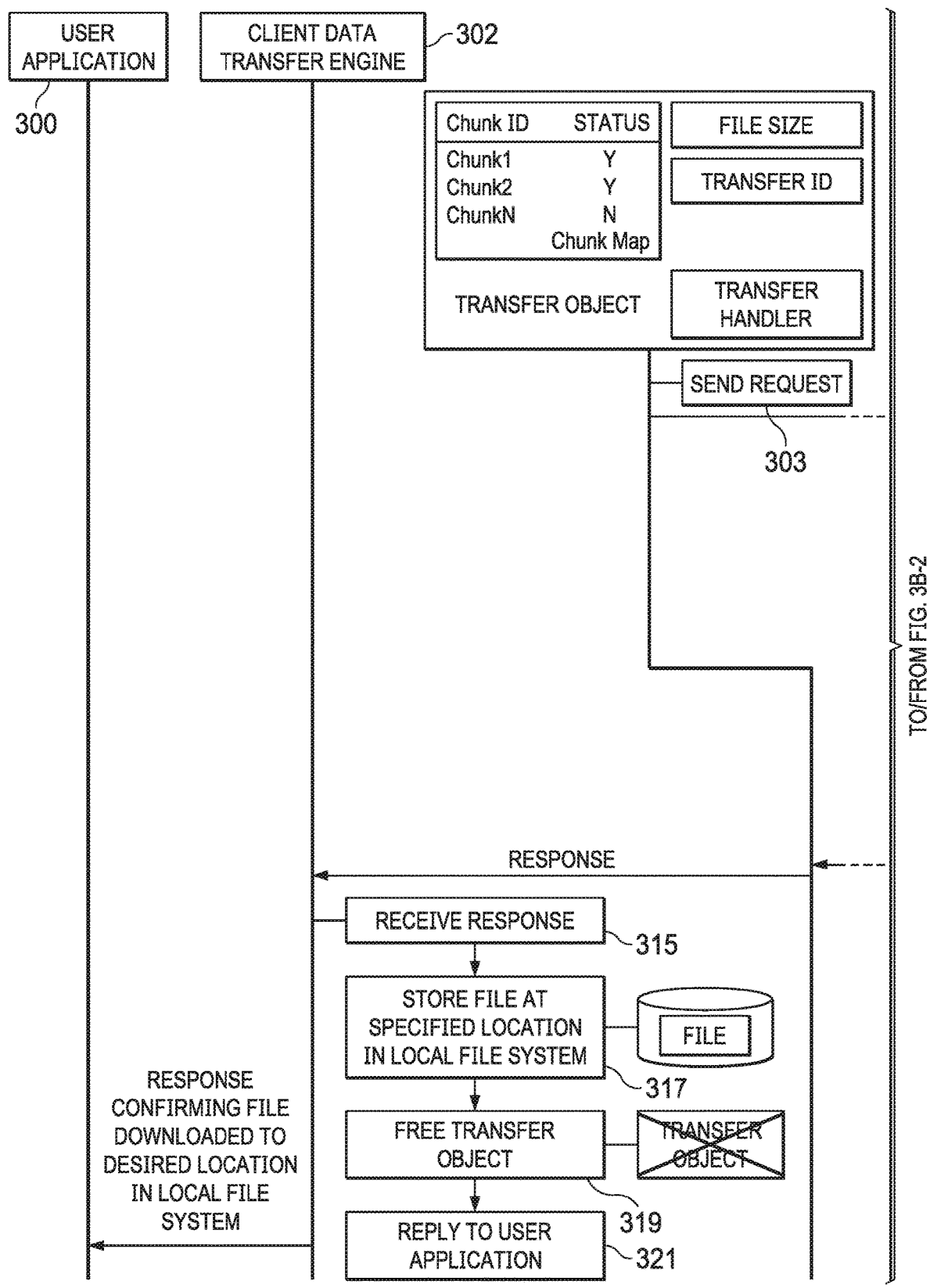
Figures 2, 3B:
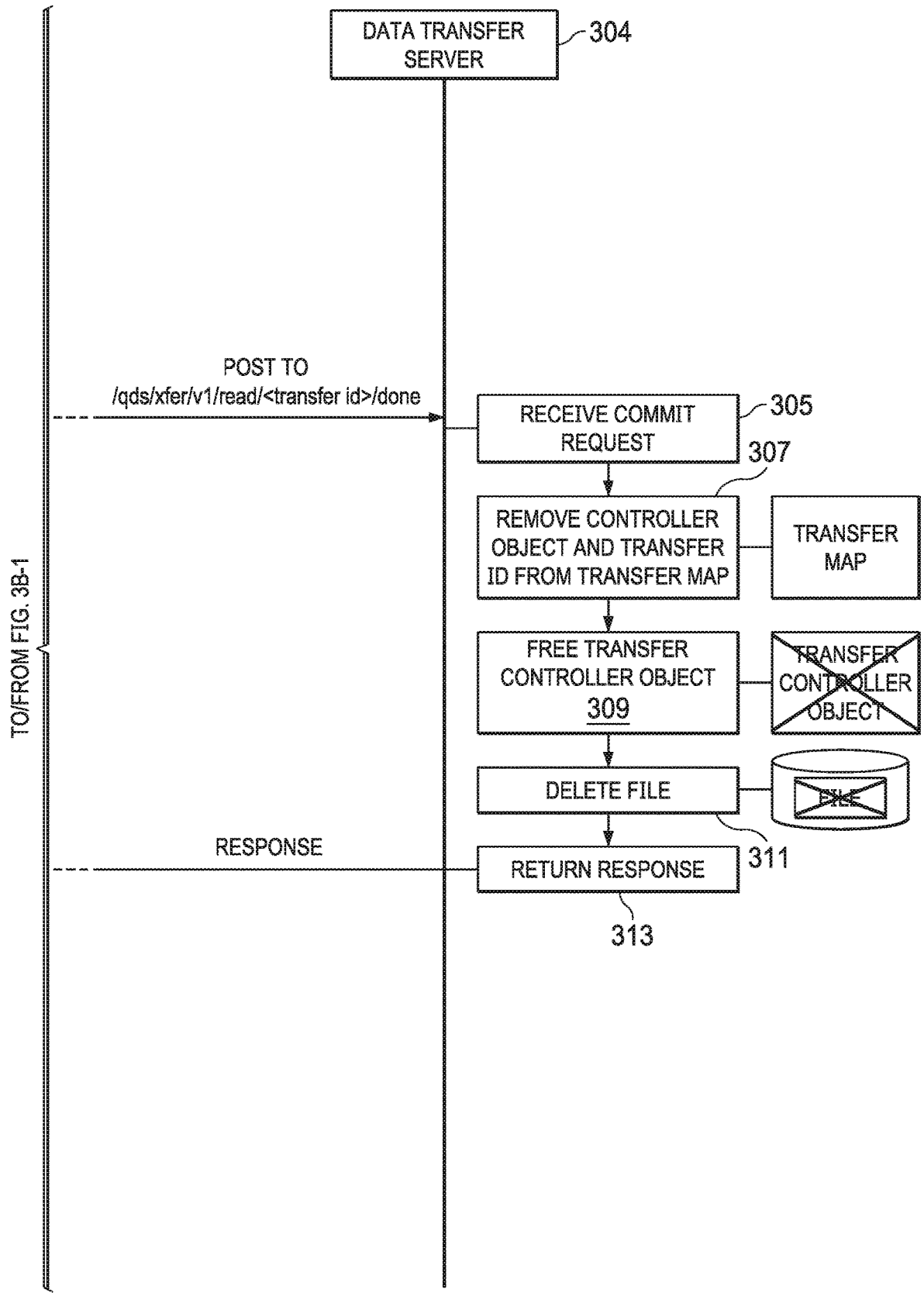

Moving now to FIGS. 3A and 3B, then, flow diagrams illustrating a data download using an embodiment of a data transfer system are depicted. As can be seen with reference to FIG. 3A, as a user is interacting with the user application 300 on a client device, a user may attempt to read or otherwise download a file from a content management system 301. The user application 300 may call the data transfer engine application interface of the client data transfer engine 302 to request a download and pass contextual information associated with the download to the client data transfer engine 302 to accomplish the transfer of the file (STEP 206). For example, the request may include the location on the client device where the file to be downloaded is will be located. The request may also include the location of the file to be downloaded at the content management system 301. Additionally, the context of the request to the data transfer application interface may include authentication data such as user credentials or tokens obtained from, or used with, content management system for authentication.

When such a request is received, the client data transfer engine 302 may create a file in the local filesystem at the client device where the downloaded file will be stored (STEP 308). The created file may reside at the location at the client device 302 specified for the downloaded file in the initial request received from the user application 300 or may be at another location that may later be moved to the specified location. The download of the file from content management system 301 can then be initiated using the common data transfer interface of the data transfer server 304 by sending a request to the data transfer server 304 through the interface (STEP 310). This request may specify the transfer is for a download and provide the contextual data for the data transfer, including a location associated with the file to be transferred at the content management system, a chunk size to use, or any needed user authentication information.

When a request to initiate the download of a file is received at the data transfer server 304 (STEP 312), the data transfer server 304 may generate a transfer identifier to be used for the data transfer (STEP 314). Additionally, a transfer controller object for use with the data transfer and an associated file for storage of data to be received during the transfer may be created (STEPS 318, 320). An association between the transfer identifier generated for the transfer and the created transfer controller object may be entered in a transfer map for maintaining such associations (STEP 322).

The transfer controller object associated with the transfer can utilize the location of the file at the content management system 301 for the file being transferred to send a request to the native interface of the content management system 301 requesting the download of the file at that location (STEP 324). The content management system 301 can access the file at the specified location at the repository of the content management system 301 (STEP 326) and respond to the data transfer server 304 with the data of the file (STEP 328). This response may be, for example, a stream of file data associated with the file from the content management system 301 to the data transfer server 304. When the transfer controller object receives the file data from the content management system 301 it may write the data into the associated file at the data transfer server 304 (STEP 330). The data transfer server 304 can also return the generated transfer identifier to the client data transfer engine 302 (STEP 332).

When the client data transfer engine 302 receives the transfer identifier from the data transfer server 304 (STEP 334), the client data transfer engine 302 may create a transfer object for the initiated transfer. (STEP 336) This transfer object may include a transfer handler for handling the transfer of data for the initiated transfer. The transfer object is thus configured with, or can obtain, the transfer identifier returned by the data transfer server 304 and the location of the file in the filesystem at the client device where the downloaded file is to be stored. Again, this file may reside at the location in filesystem specified for the downloaded file in the initial request received from the user application 300 or may be at another location that may later be moved to the specified location.

The transfer handler may then create a chunk map (STEP 338). The chunk map may therefore include the size of the file, how many chunks there will be and status indicating, for example, whether those chunks have been transferred. Here, the transfer handler may not be aware of the size of the data file being transferred (e.g., be because the data file is resident at the content management server 301). Accordingly, the chunk map may initially be established without any chunk entries and may be dynamically updated with chunk entries as the existence of chunks can be determined.

The transfer handler can then request chunks of the file from the data transfer server 304. Until there are no more chunks to receive (e.g., an EOF indicator is received from the data transfer server 304), the transfer handler may asynchronously or continuously request the transfer of a chunk using the set of request threads managed by the request handler. Specifically, the transfer handler can request the transfer of a chunk (STEP 340). If there is no indication to stop the download of the file (N branch of STEP 342) the request process may continue to send requests (STEP 340) while if the requests should be stopped (e.g., e.g., an EOF indicator is received from the data transfer server 304), the sending of chunk requests to the data transfer server 304 may stop (STEP 344).

The requests from the transfer handler to download a chunk of a file may be sent to the request handler. The request handler places these received requests on the request queue (STEP 346). The request handler can then wait for a request thread to be free (STEP 348). When a request thread is free, the request handler may provide the next request on the request queue to the free request thread (STEP 350). If there are no more requests on the queue (N branch of STEP 352) the request process may idle (STEP 354) while if there are more request that have not been sent (Y branch of STEP 352) the process may determine the wait for the next free request thread (STEP 354).

The request thread may then send the chunk to the data transfer server (STEP 356) by sending a request (e.g., an HTTP request) to the common data transfer interface of the data transfer server 304. The request thread can then await any response from the data transfer server 304 or a timeout of the request (STEPS 358, 360).

When the data transfer server 304 receives a request for a chunk for a download at the common data transfer interface (STEP 362), the transfer identifier included in the request and the transfer map can be used to determine the transfer controller object associated with the transfer identifier of the request and route the request to that transfer controller object (STEPs 364, 366). The transfer controller object associated with the transfer can then lock the file (STEP 368) (e.g., the file to which the file received from the content management system 301 was stored). The transfer controller object may maintain a current location pointer for the file (e.g., which may indicate, or can be used to determine how much data of the file has been previously sent). Thus, using the location pointer it can be determined what data of the file has been previously transferred in a response to the client data transfer engine and thus if any more data of the file remains to be sent in a chunk (STEP 370).

If the location pointer indicates that the end of the file has been reached (e.g., all data of the file has been transferred) (N branch of STEP 370), the transfer controller object can send a response with an end of file (EOF) marker or indicator (STEP 372). Otherwise, using the current location pointer the transfer controller object can obtain (e.g., determine and read) a next chunk of the configured chunk size (or less if the remaining data is less than the configured chunk size) from the file associated with the transfer beginning at the current location, and update the current location pointer (STEP 374).

The data transfer server 304 can then send a response to the received download request back to the client data transfer engine 302 with the chunk and the length of that chunk or the offset (e.g., beginning byte) of that chunk within the data file being transferred (or, if there was a problem, that the transfer of the chunk has failed) (STEP 376). This offset may, for example, be the same as the location pointer (or a byte different) when the request was received. In one embodiment, if the chunk being transferred is the last chunk of the file the response with the chunk data may also include an EOF indicator.

This response from the data transfer server 304 may be received at the request thread that issued the associated original request (STEP 378), and the response provided from the request thread to the associated transfer handler associated with the data transfer. When transfer handler receives the response (STEP 380), the transfer handler can determine if the response includes EOF indicator or includes data for a chunk (STEP 382). If the response includes data for a chunk (N branch of STEP 382), the transfer handler may update the chunk map associated with the data transfer based on the response and the offset included therein (STEP 384). This update may entail the determination and creation of chunk entries for sets of chunks that may exist or have been received, the updates of associated offsets of the creation or update of the status associated with one or more chunk entries indicating a chunk has been received or not. The transfer handler may also write the chunk data into the file associated with the transfer at the offset specified in the response (STEP 386).

If the response includes an EOF indicator (N branch of STEP 382) the issuing of requests for the data transfer may be stopped, by for example, setting a flag or other indication to stop the requests (e.g., as will be determined at STEP 342) (STEP 388). Additionally, if there was chunk data included in the response that included the EOF indicator, the chunk map may be updated and the chunk data written into the file.

The completion of outstanding requests (or a certain amount of time) may be waited and the chunk map checked to determine if any of the chunks for the file being transferred have not been received based on the status of the chunk entries in the chunk map (STEP 390). Using the chunk map for the data transfer then, and the status associated with each of the chunk entries on the chunk map, the transfer handler can determine if all the chunks of the data file have been received. If at this point not all chunks have been received (Y branch of STEP 382), the transfer handler may restart the transfer or report an error to the initiating user application 300 (STEP 392). If, however, all chunks of the file have been received (N branch of STEP 382), the transfer handler may complete the data transfer by sending a transfer done request with the transfer identifier to the data transfer interface of the data transfer server 304 (STEP 394).

Moving to FIG. 3B, the transfer handler may close the data transfer by sending a transfer done request with the transfer identifier to the common data transfer interface of the data transfer server 304 (STEP 303). When the data transfer server 304 receives such a download close request at the common data transfer interface (STEP 305), the transfer identifier included in the request and the transfer map can be used to determine the transfer controller object associated with the data transfer (STEP 307). The data transfer server 304 can free the transfer controller object associated with the transfer, remove the association between the transfer identifier and the transfer controller object from the transfer map and delete the file created for the transfer (STEPS 309, 311, 311). The data transfer server 304 may then respond to the commit request from the client data transfer engine 302 (STEP 313). In other embodiments such a response may not be sent.

The response from the data transfer server 304 may be received at the request thread that issued the associated commit request, and the response provided from the request thread to the associated transfer handler associated with the data transfer and, in turn, to the client data transfer engine 302. When client data transfer engine 302 receives the response (STEP 315) (or after the commit request is sent at STEP 303), the client data transfer engine 302 may move the file to which the data from the content management system was downloaded to the location specified for the file in the request for the file as received from the user application 300 if needed (STEP 317), and may free the transfer object associated with the data transfer (STEP 319). The client data transfer engine 302 can then respond to the user application 300 that originally issued the data transfer request through the data transfer engine application interface (STEP 321), confirming download of the file from the content management system 301 to the specified location.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

APPENDIX

| CLIENT DATA TRANSFER ENGINE APPLICATION INTERFACE | |
|---|---|
| POST /upload/start | request a file upload |
|     post data: | |
|         clientPath (str) | local path to file |
|         parentId (str) | parentId to contain uploaded file |
|         fileName (str) | name for uploaded file |
|         includeInfo (bool) | request return of file info |
|     returns: | |
|         transferId (str) | transfer identifier |
|         complete (bool) | transfer completed |
|         success (bool) | transfer successful |
|         fileSize (long) | byte size of file (optional, only present if complete) |
|         fileInfo (object) | optional file JSON object returned from Core upload |
| | (only present if complete) |
|         errorMessage (str) | if any |
|     status: 200 | |
| GET /upload/{transfer_id}/polling | get status of current upload |
|     returns: | |
|         fileSize (long) | byte size of file |
|         transferred (long) | bytes transferred so far |
|         complete (bool) | transfer completed |
|         success (bool) | transfer successful |
|         fileInfo (object) | optional file JSON object returned from Core upload |
|         errorMessage (str) | if any |
|     status: 200 | |
| POST /upload/{transfer_id}/cancel | cancel current upload |
|     post data:    none | |
|     returns: | |
|         isCancelled (bool) | successful cancellation |
|         errorMessage(str) | if any |
|     status: 200 | |
| POST /download/start | request a file download |
|     post data: | |
|         clientPath (str) | local folder path to save downloaded file |
|         fileName (str) | name for downloaded file |
|         id (str) | server id of file to download |
|     returns: | |
|         transferId (str) | transfer identifier |
|         complete (bool) | transfer completed |
|         success (bool) | transfer successful |
|         fileSize (long) | byte size of file (optional, only present if completed) |
|         errorMessage (str) | |
|     status: 200 | |
| GET /download/{transfer_id}/polling | get status of current download |
|     returns: | |
|         fileSize (long) | byte size of file |
|         transferred (long) | bytes transferred so far |
|         complete (bool) | transfer completed |
|         success (bool) | transfer successful |
|         errorMessages (str) | if any |
|     status: 200 | |
| POST /download/{transfer_id}/cancel | cancel current download |
|     post data:    none | |
|     returns: | |
|         isCancelled (bool) | successful cancellation |
|         errorMessage(str) | if any |
|     status: 200 | |

What is claimed is:

1. A method comprising:
at a transfer handler of a data transfer server, receiving a request to initiate the data transfer of a client file associated with a client application from a client device having the client application executing thereon to a content management system;
for each chunk of a set of chunks identified in a chunk map created on the client device,
receiving, by the transfer handler, an upload request containing the chunk, and
storing, by the transfer handler, the chunk into a corresponding transfer file on the data transfer server;
receiving, by the transfer handler, a commit request; and
sending, by the transfer handler in response to receiving the commit request, a file storage request to the content management system, the file storage request containing the transfer file.

2. The method of claim 1, further comprising, in response to receiving the request to initiate the data transfer, the transfer handler generating a transfer identifier corresponding to the data transfer and returning the transfer identifier responsive to the request to initiate the data transfer.

3. The method of claim 2, further comprising, in response to receiving the request to initiate the data transfer, the transfer handler creating a corresponding transfer controller object and the corresponding transfer file.

4. The method of claim 2, wherein each upload request contains the transfer identifier.

5. The method of claim 1, wherein the chunk map includes a size of the client file and a number of chunks that comprise the client file.

6. The method of claim 5, wherein the chunk map further includes an identifier for each chunk and a corresponding offset of the chunk from a beginning of the client file.

7. The method of claim 1, further comprising, when each upload request is received by the transfer handler, identifying the transfer identifier in the upload request, determining the transfer controller object corresponding to the transfer identifier, and storing the chunk into the transfer file corresponding to the transfer controller object.

8. The method of claim 1, further comprising, after receiving each upload request, returning a response indicating either that the chunk has been successfully received, or that the transfer of the chunk has failed.

9. The method of claim 1, further comprising obtaining, by the transfer handler, a location in the content management system for storing the transfer file, wherein the file storage request to the content management system specifies the location.

10. The method of claim 1, further comprising receiving, by the transfer handler from the content management system, a response confirming storage of the transfer file on the content management system.

11. The method of claim 10, in response to receiving the response confirming storage of the transfer file on the content management system, freeing the corresponding transfer controller object and removing an association between the transfer identifier and the corresponding transfer controller object from the chunk map.

12. The method of claim 10, in response to receiving the response confirming storage of the transfer file on the content management system, removing from the data transfer server the transfer file and any other objects associated with the data transfer of the client file.

13. The method of claim 10, in response to receiving the response confirming storage of the transfer file on the content management system, responding to the commit request with an indication that the data transfer of the client file has been successful.

14. A non-transitory computer readable medium, storing instructions executable by a processor for:
at a transfer handler of a data transfer server, receiving a request to initiate the data transfer of a client file associated with a client application from a client device having the client application executing thereon to a content management system;
for each chunk of a set of chunks identified in a chunk map created on the client device:
receiving, by the transfer handler, an upload request containing the chunk, and
storing, by the transfer handler, the chunk into a corresponding transfer file on the data transfer server;
receiving, by the transfer handler, a commit request; and
sending, by the transfer handler in response to receiving the commit request, a file storage request to the content management system, the file storage request containing the transfer file.

15. The non-transitory computer readable medium of claim 14, the instructions further executable by the processor for, in response to receiving the request to initiate the data transfer, the transfer handler: generating a transfer identifier corresponding to the data transfer and returning the transfer identifier responsive to the request to initiate the data transfer; and creating a corresponding transfer controller object and the corresponding transfer file.

16. The non-transitory computer readable medium of claim 14, wherein the chunk map includes a size of the client file, a number of chunks that comprise the client file, an identifier for each chunk and a corresponding offset of the chunk from a beginning of the client file.

17. A data transfer server comprising:
one or more server machines coupled to one or more data storage devices, the one or more server machines comprising a transfer handler configured to:
receive a request to initiate the data transfer of a client file associated with a client application from a client device having the client application executing thereon to a content management system;
for each chunk of a set of chunks identified in a chunk map created on the client device,
receive an upload request containing the chunk, and
store the chunk into a corresponding transfer file on the data transfer server;
receive a commit request; and
send, in response to receiving the commit request, a file storage request to the content management system, the file storage request containing the transfer file.

18. The data transfer server of claim 17, the transfer handler further configured to, in response to receiving the request to initiate the data transfer: generate a transfer identifier corresponding to the data transfer and return the transfer identifier responsive to the request to initiate the data transfer; and create a corresponding transfer controller object and the corresponding transfer file.

19. The data transfer server of claim 17, wherein the chunk map includes a size of the client file, a number of chunks that comprise the client file, an identifier for each chunk and a corresponding offset of the chunk from a beginning of the client file.

\* \* \* \* \*